(12) United States Patent
Carlson

(10) Patent No.: US 8,327,728 B2
(45) Date of Patent: Dec. 11, 2012

(54) TORQUE AMPLIFYING APPARATUS AND SYSTEM

(76) Inventor: Bengt A. Carlson, Tucson, AZ (US)

( * ) Notice: Subject to any disclaimer, the term of this patent is extended or adjusted under 35 U.S.C. 154(b) by 868 days.

(21) Appl. No.: 12/429,406

(22) Filed: Apr. 24, 2009

(65) Prior Publication Data

US 2010/0000350 A1    Jan. 7, 2010

Related U.S. Application Data

(60) Provisional application No. 61/133,873, filed on Jul. 3, 2008.

(51) Int. Cl.
*G01C 19/06* (2006.01)

(52) U.S. Cl. ............................................. 74/5.37; 74/5.7

(58) Field of Classification Search .................... 74/5.22, 74/5.34, 5.37, 5.4, 5.7

See application file for complete search history.

(56) References Cited

U.S. PATENT DOCUMENTS

| | | | | |
|---|---|---|---|---|
| 2,371,368 A | * | 3/1945 | Wallace | 180/8.1 |
| 3,267,745 A | * | 8/1966 | Smead et al. | 74/5.4 |
| 3,269,024 A | * | 8/1966 | Fischer et al. | 33/301 |
| 3,452,948 A | * | 7/1969 | Chang et al. | 244/165 |
| 5,611,505 A | * | 3/1997 | Smay | 244/165 |

\* cited by examiner

*Primary Examiner* — Ha D. Ho
(74) *Attorney, Agent, or Firm* — Thaddius J. Carvis

(57) ABSTRACT

Described is a torque amplifying device that is of centrifugal or gyroscopic type and has a unidirectional drive or drives. This device is used to control the body of a controlled object, such as an airplane, helicopter, land vehicle, cargo handling mechanism, earth moving machine or maritime device or vehicle. The torque amplifying devices are designed so that they supply a torque (momentum) to the body of the controlled object where it is connected. Thereby, the orientation or weight distribution of the body is controlled. The orientation is achieved without resorting to the physical properties of the surrounding environment (ground, water or air). Thus, it can apply a torque to this body in pitch, roll and/or yaw, so that it achieves the position or weight distribution the control system is calling for. The duration of the torque can be unlimited, until the conditions that produce it are intentionally changed.

20 Claims, 26 Drawing Sheets

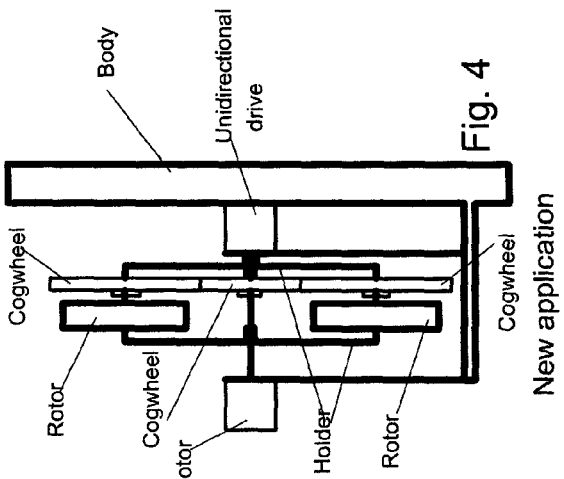
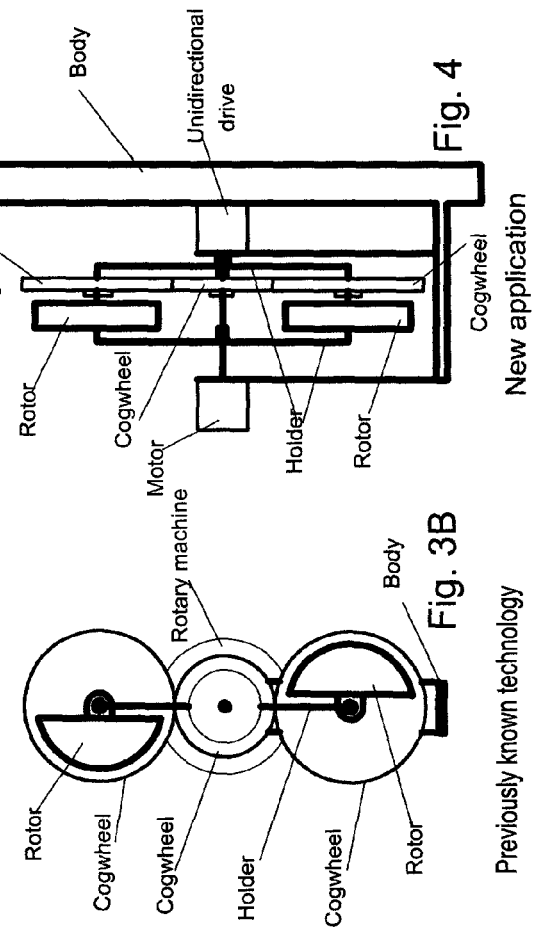
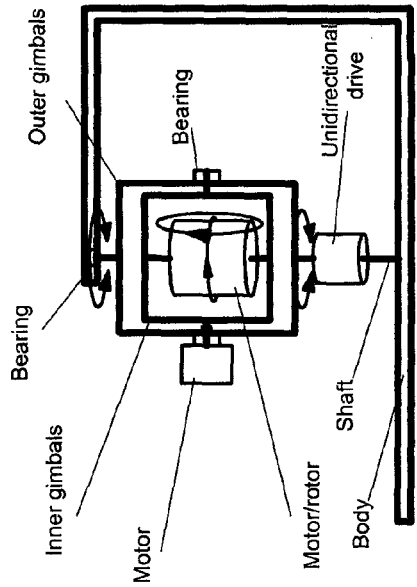
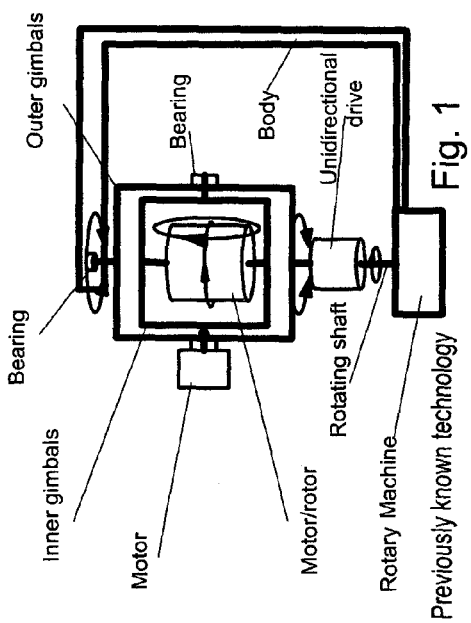
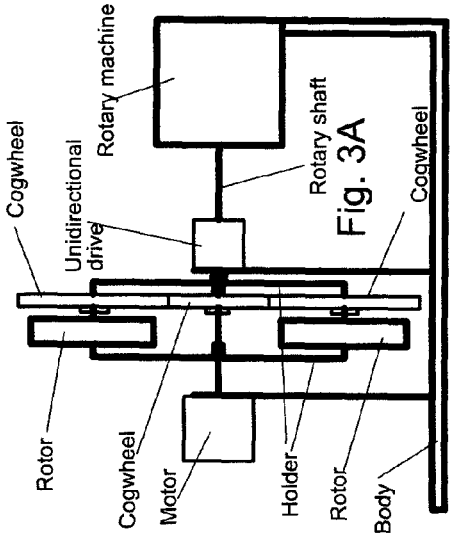

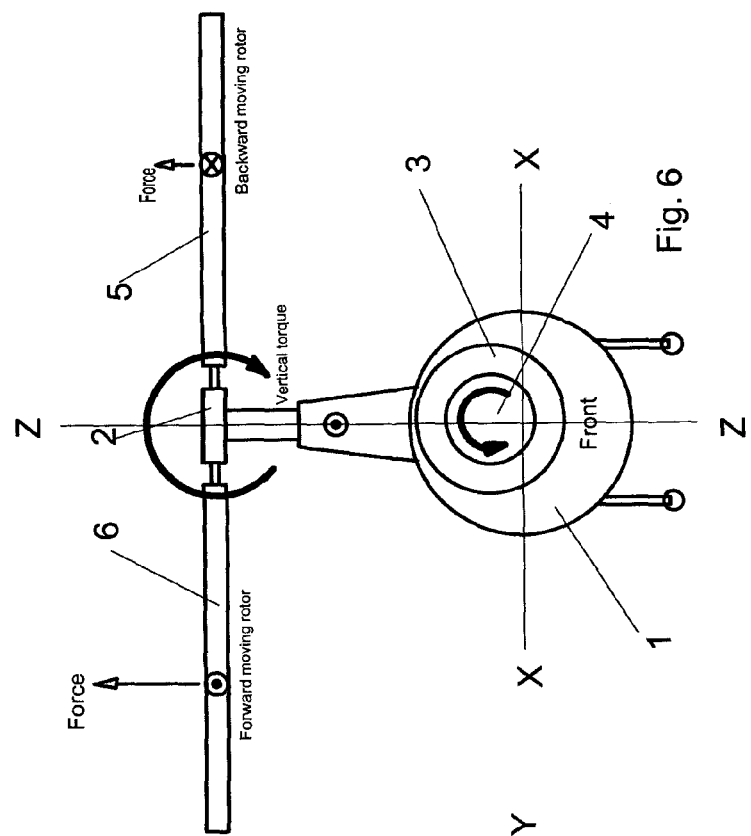
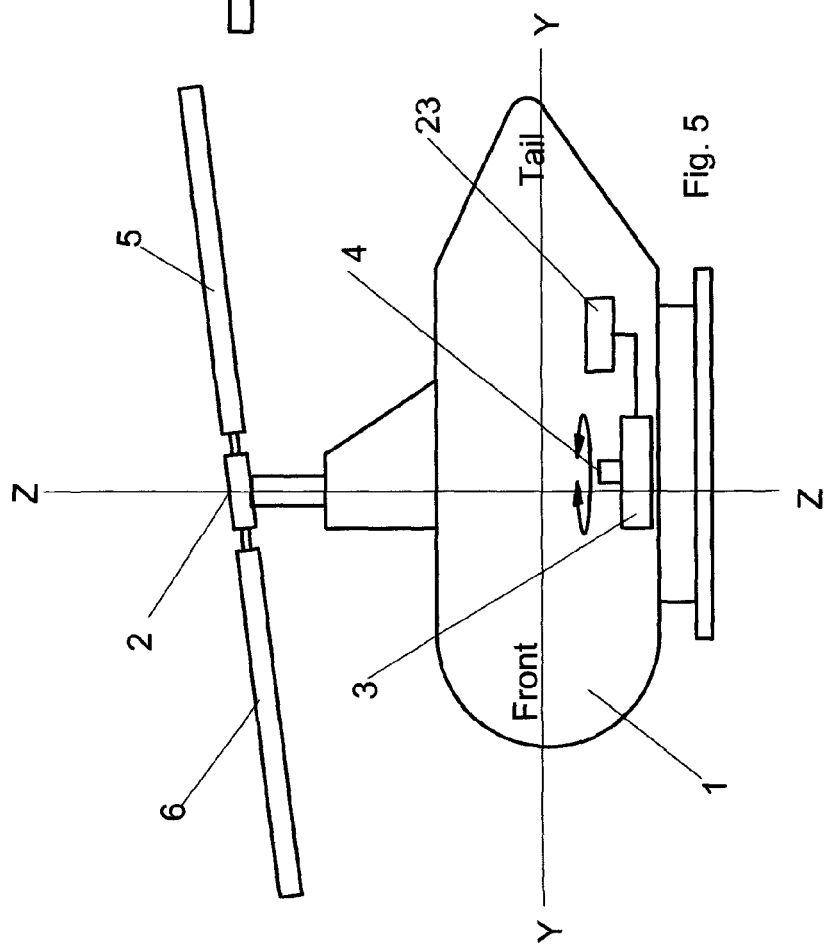

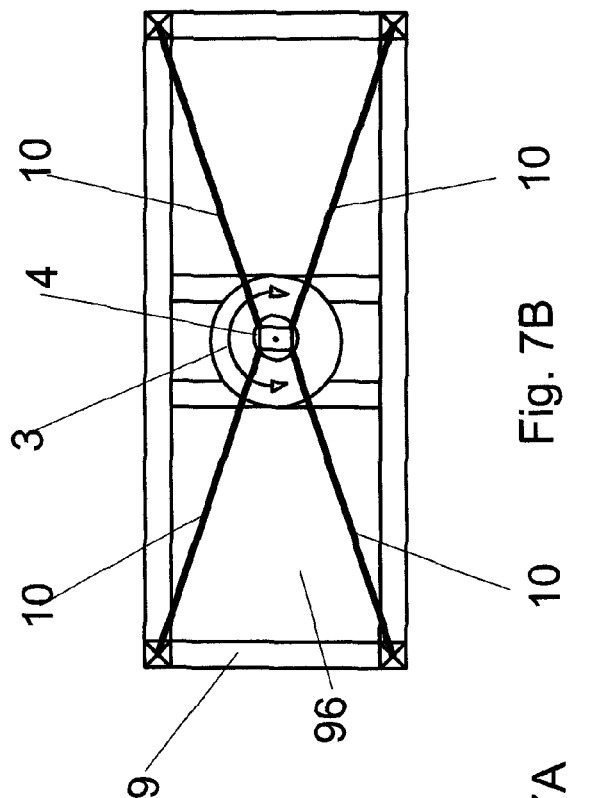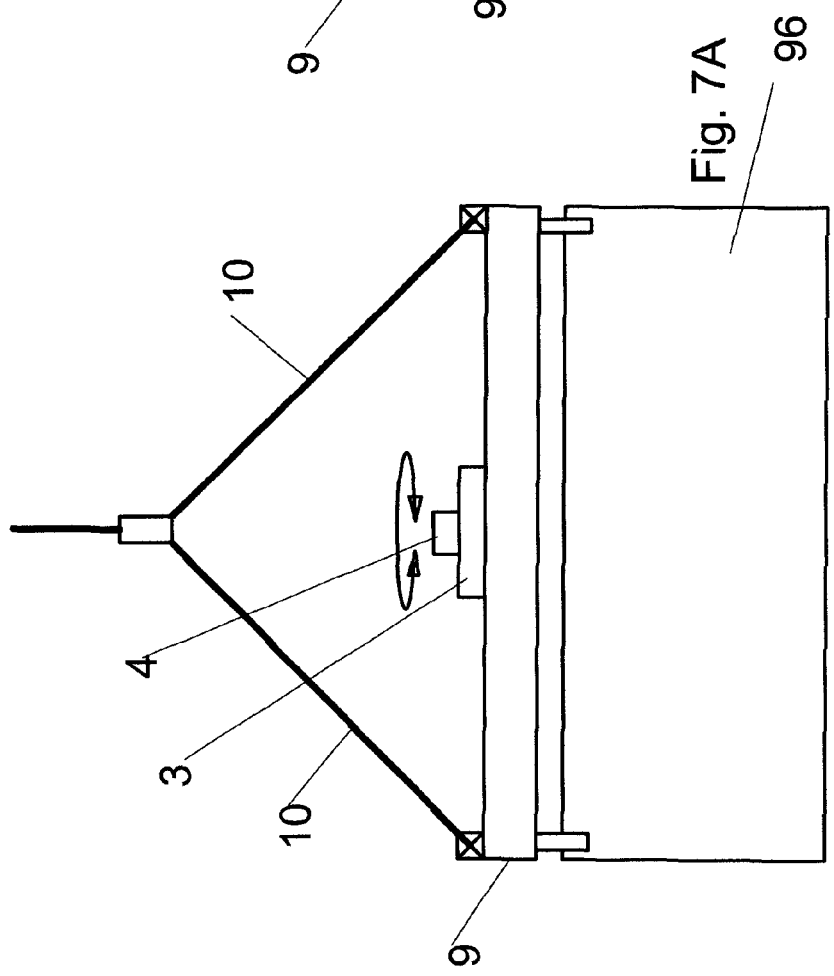

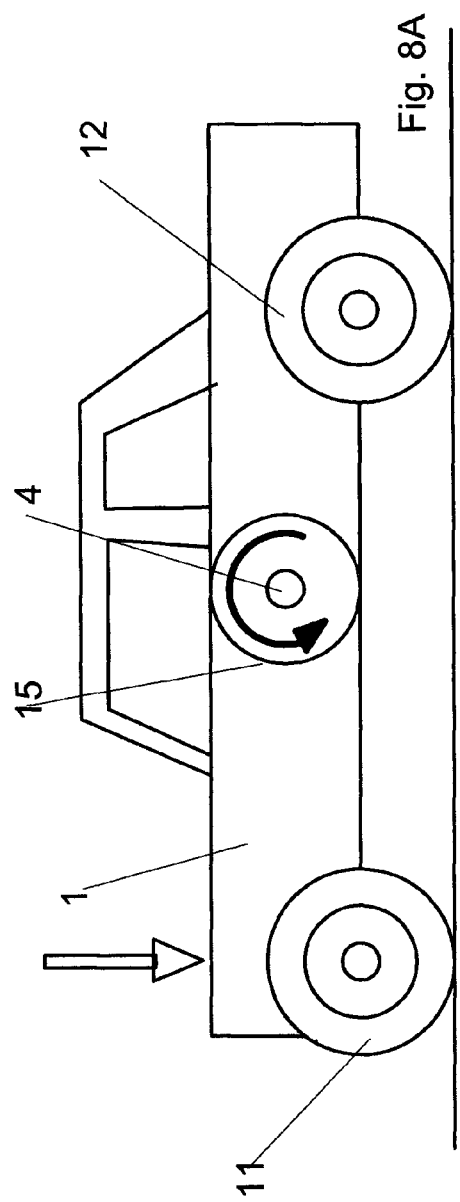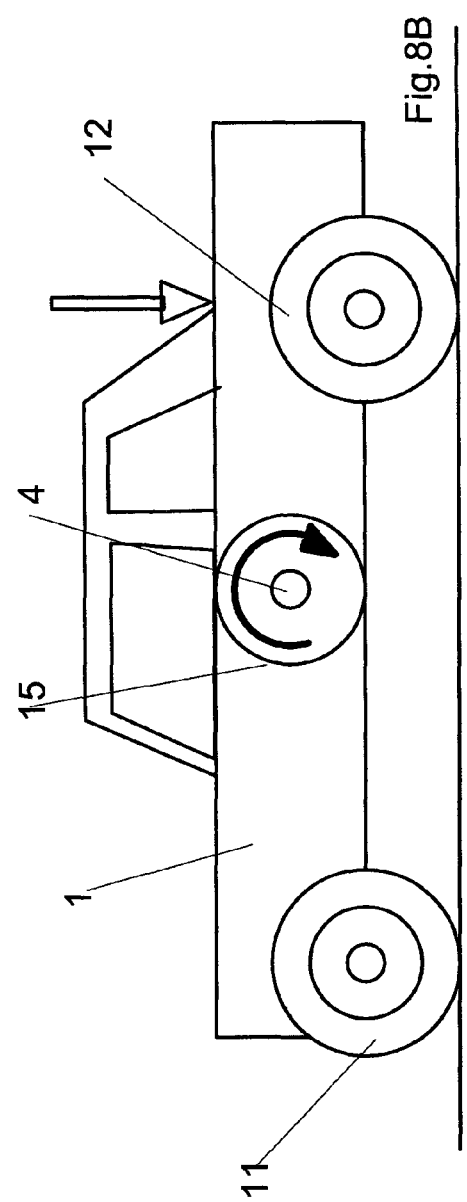

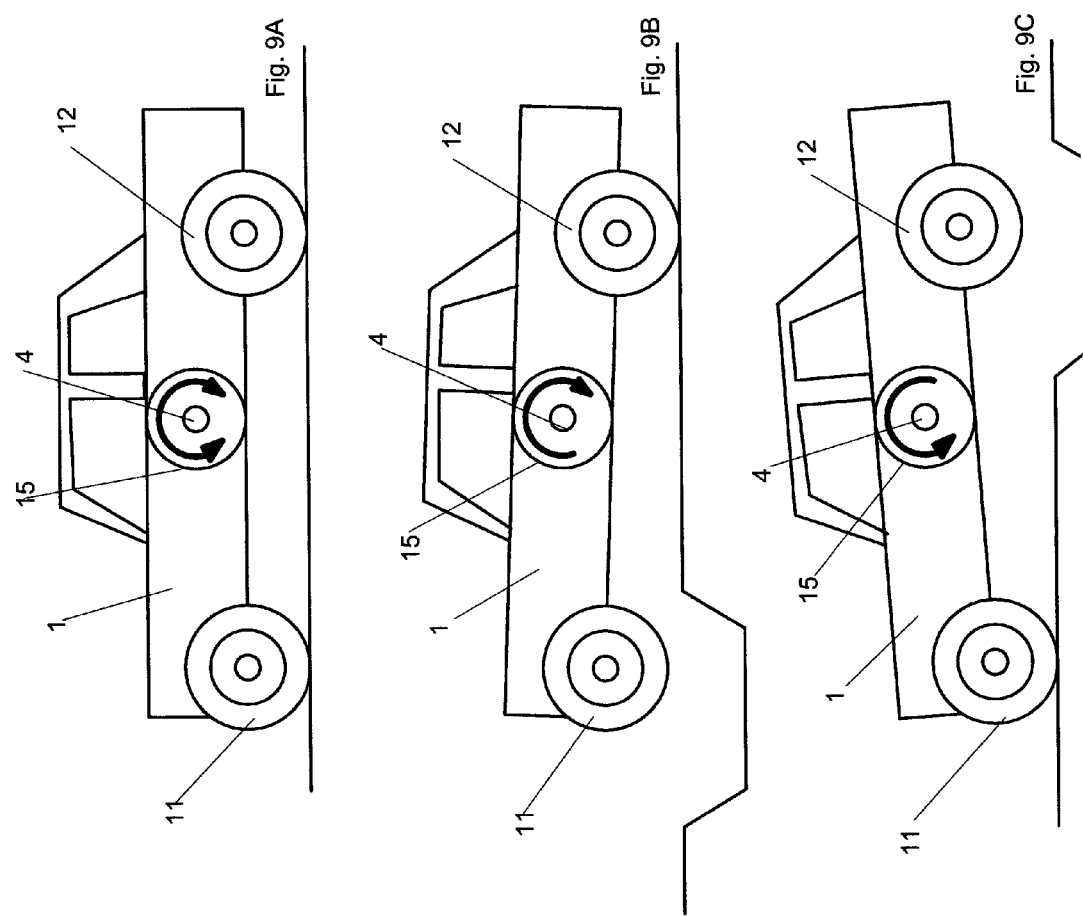

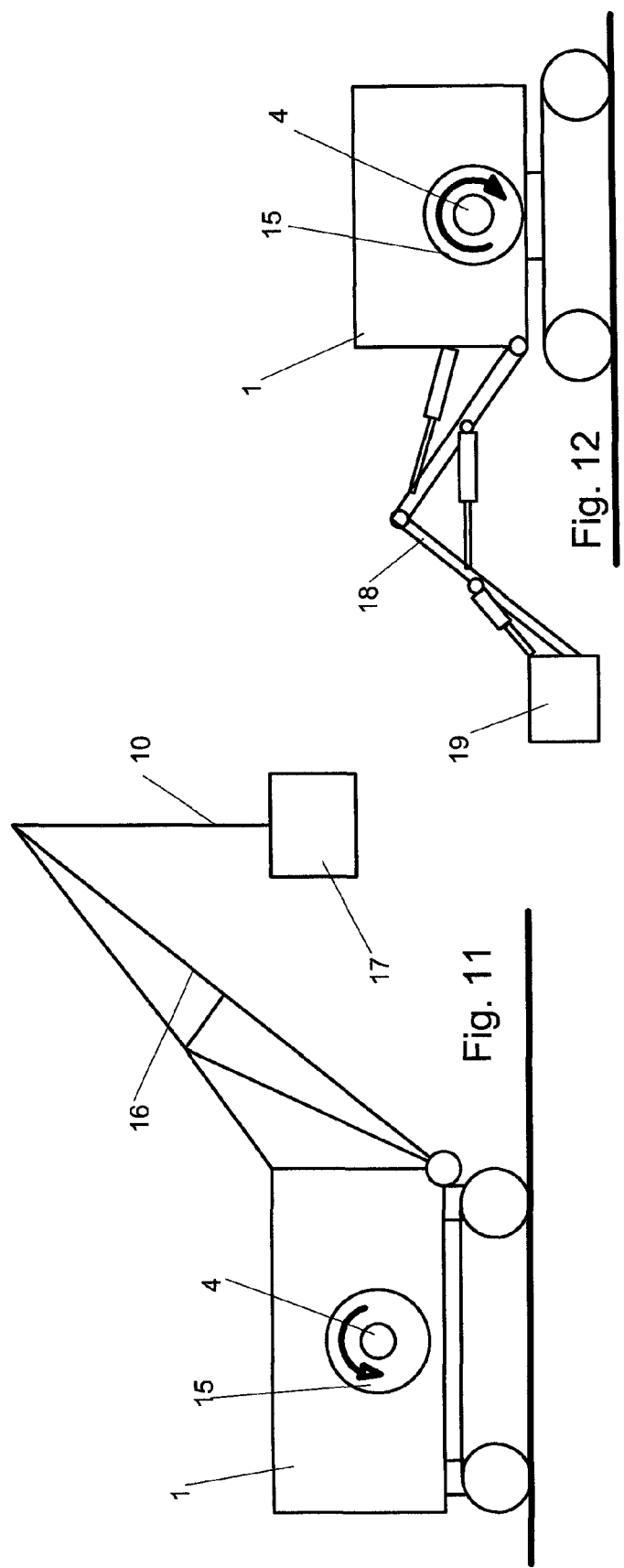

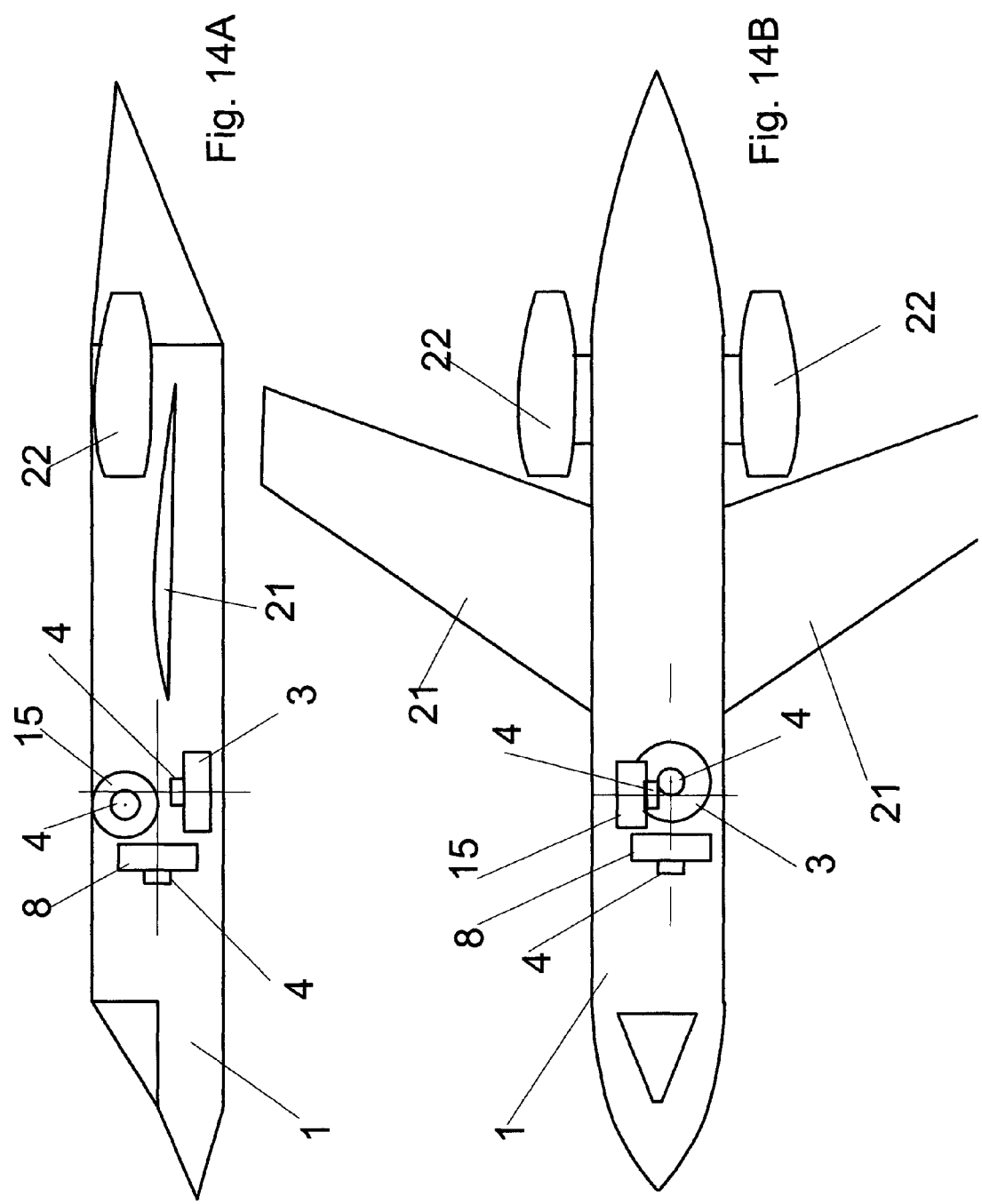

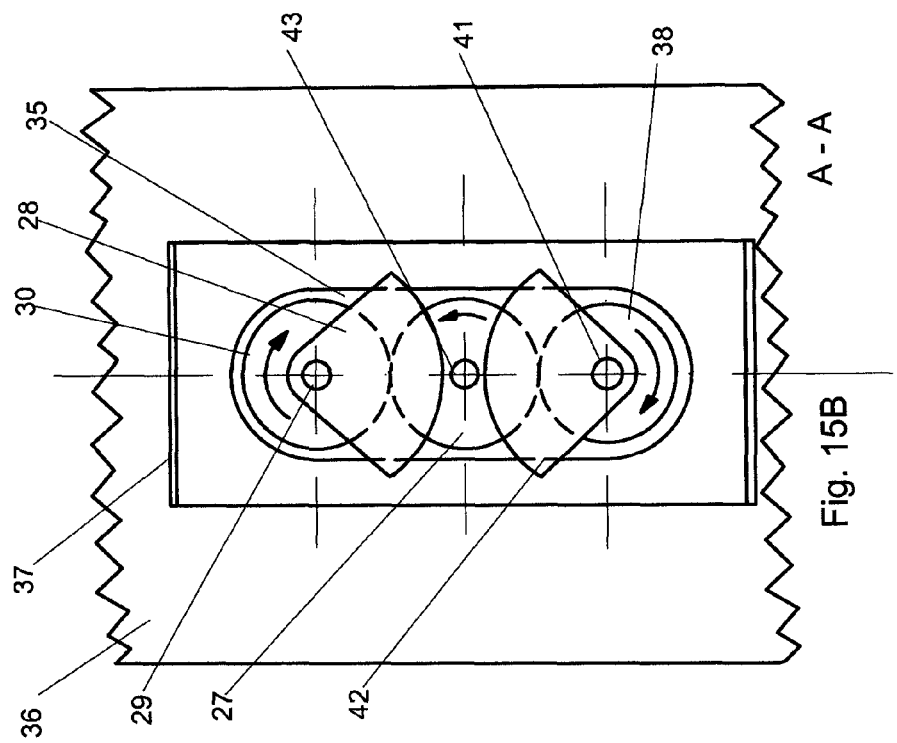
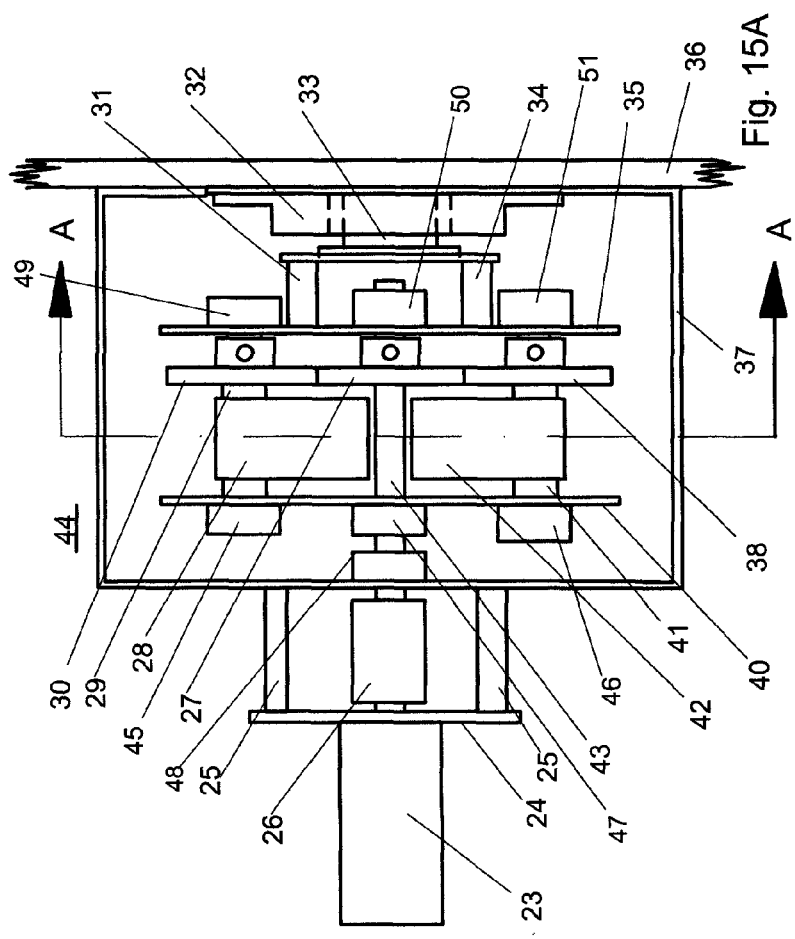
Fig. 15B
Fig. 15A

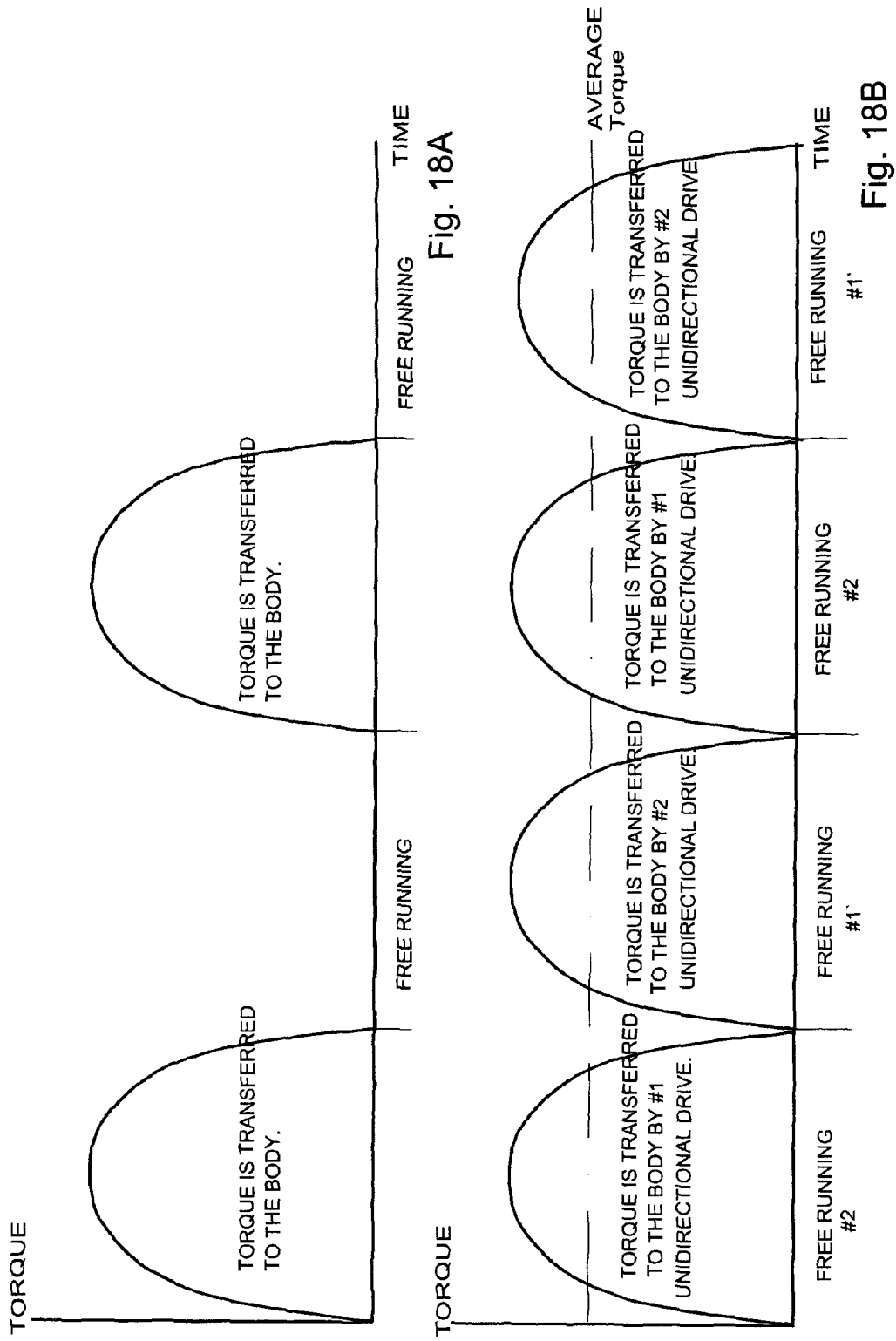

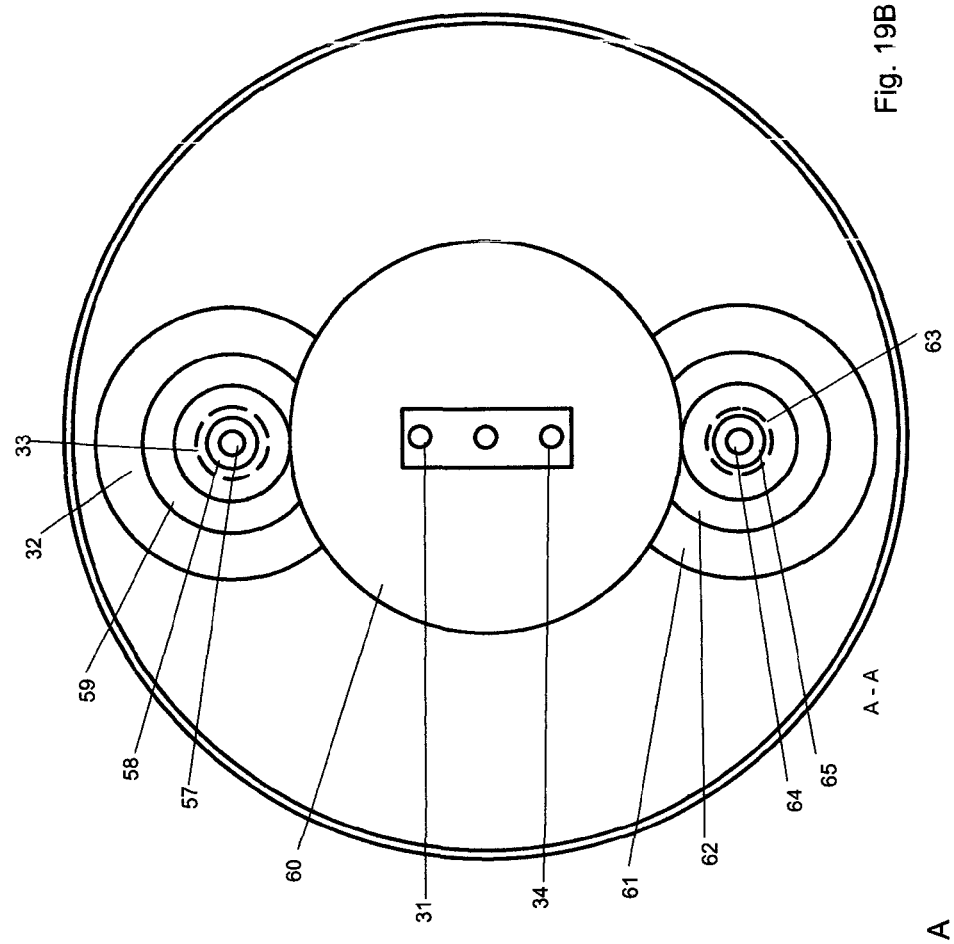
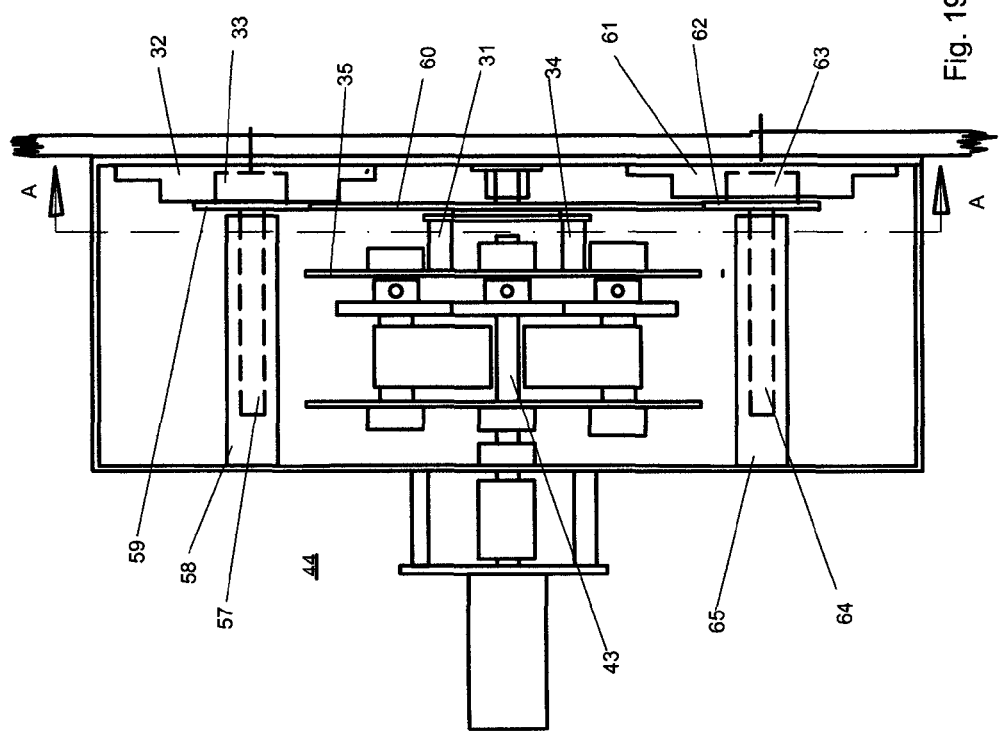

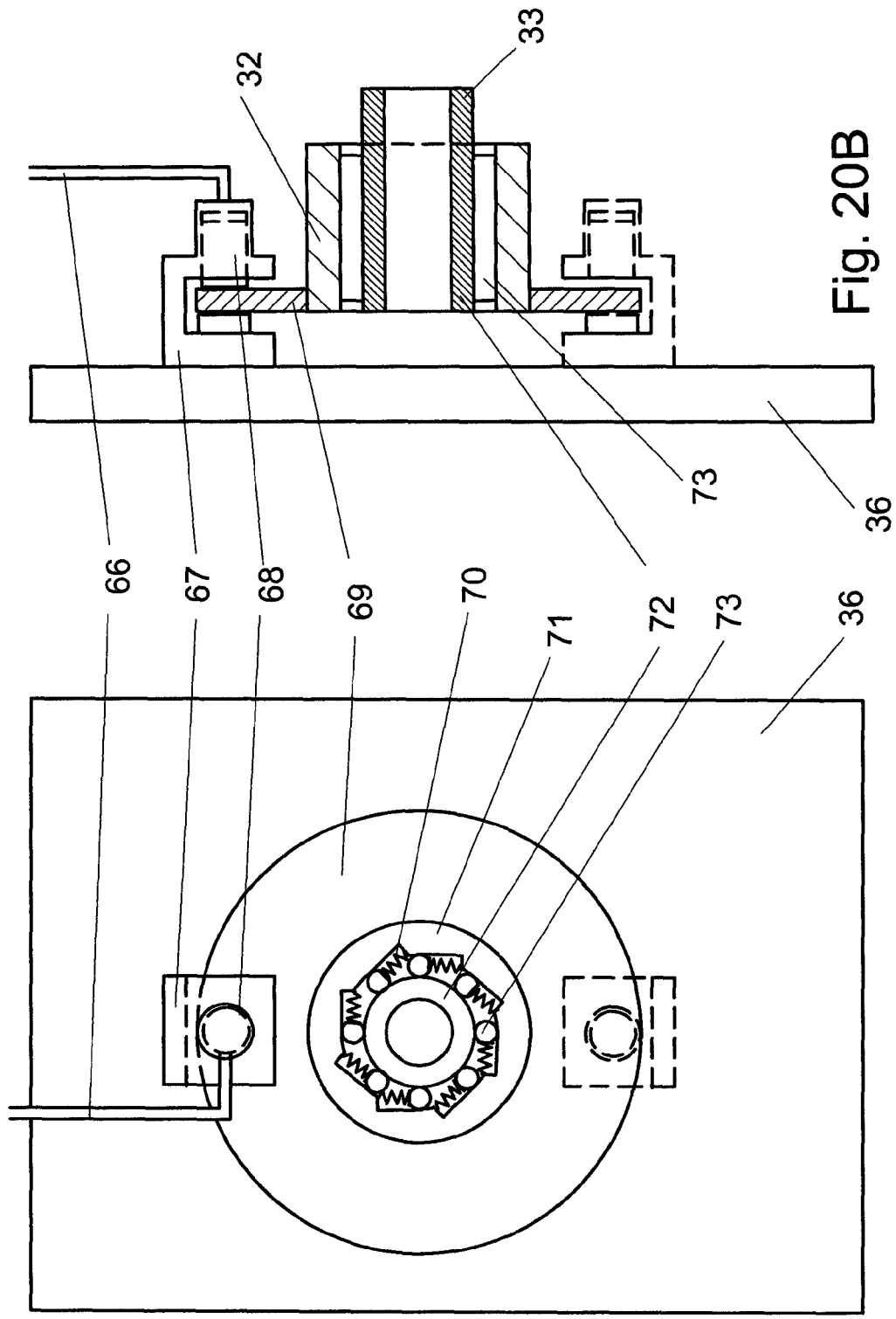

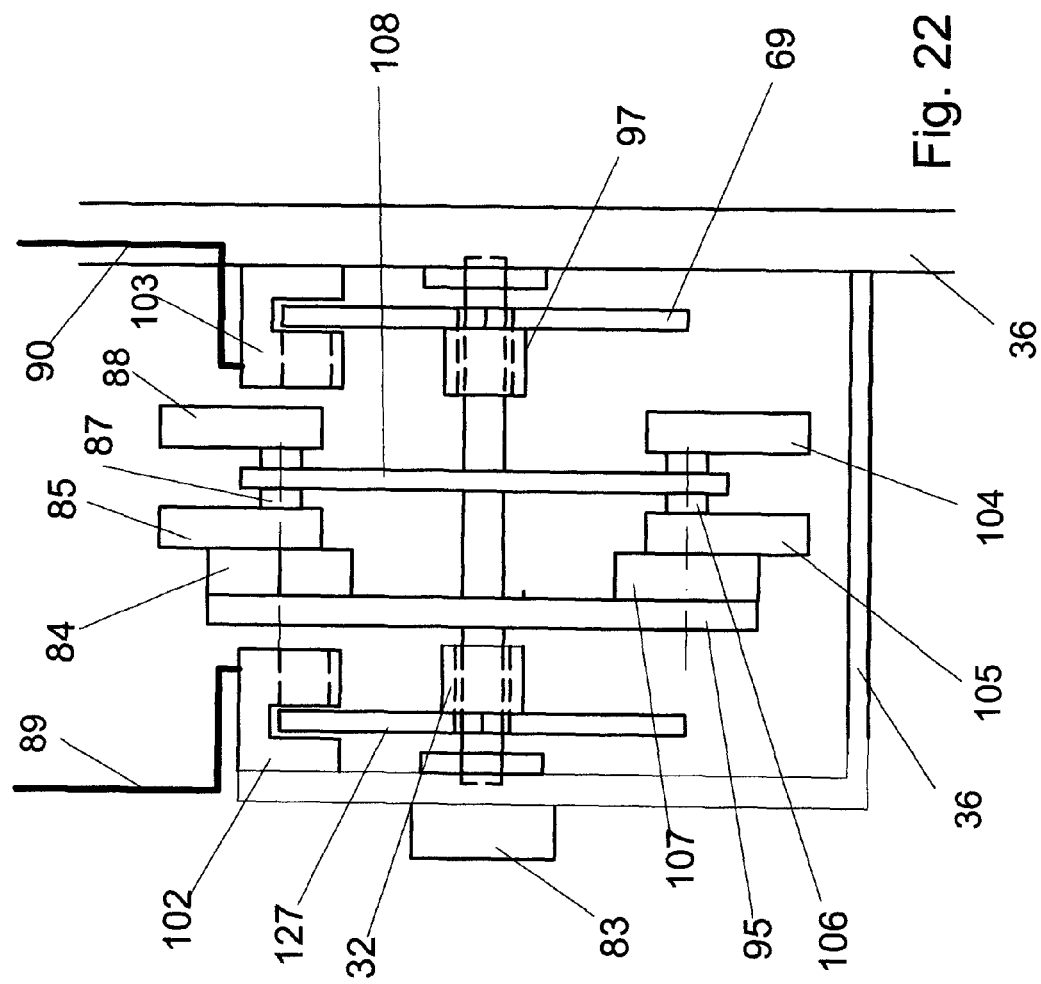

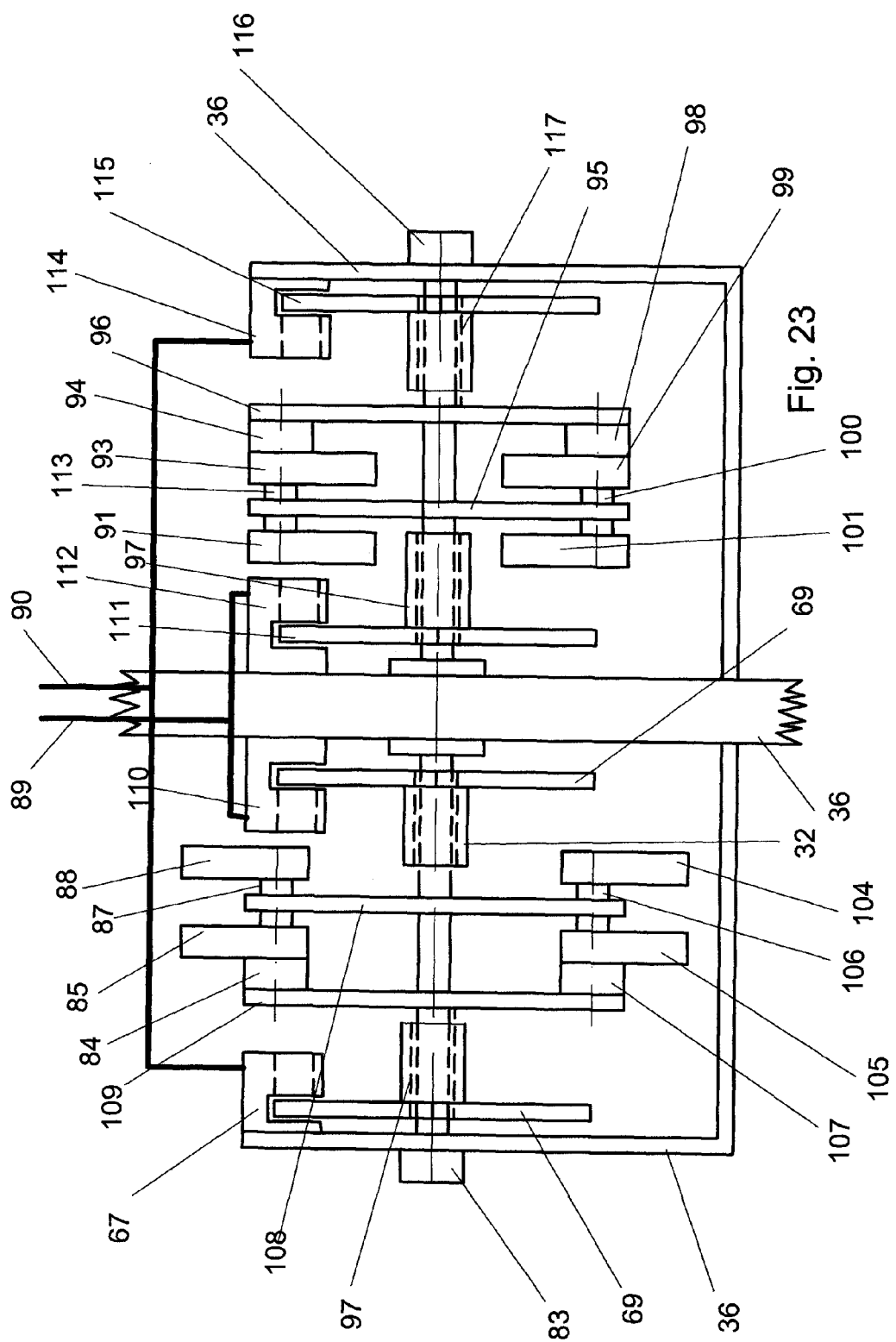

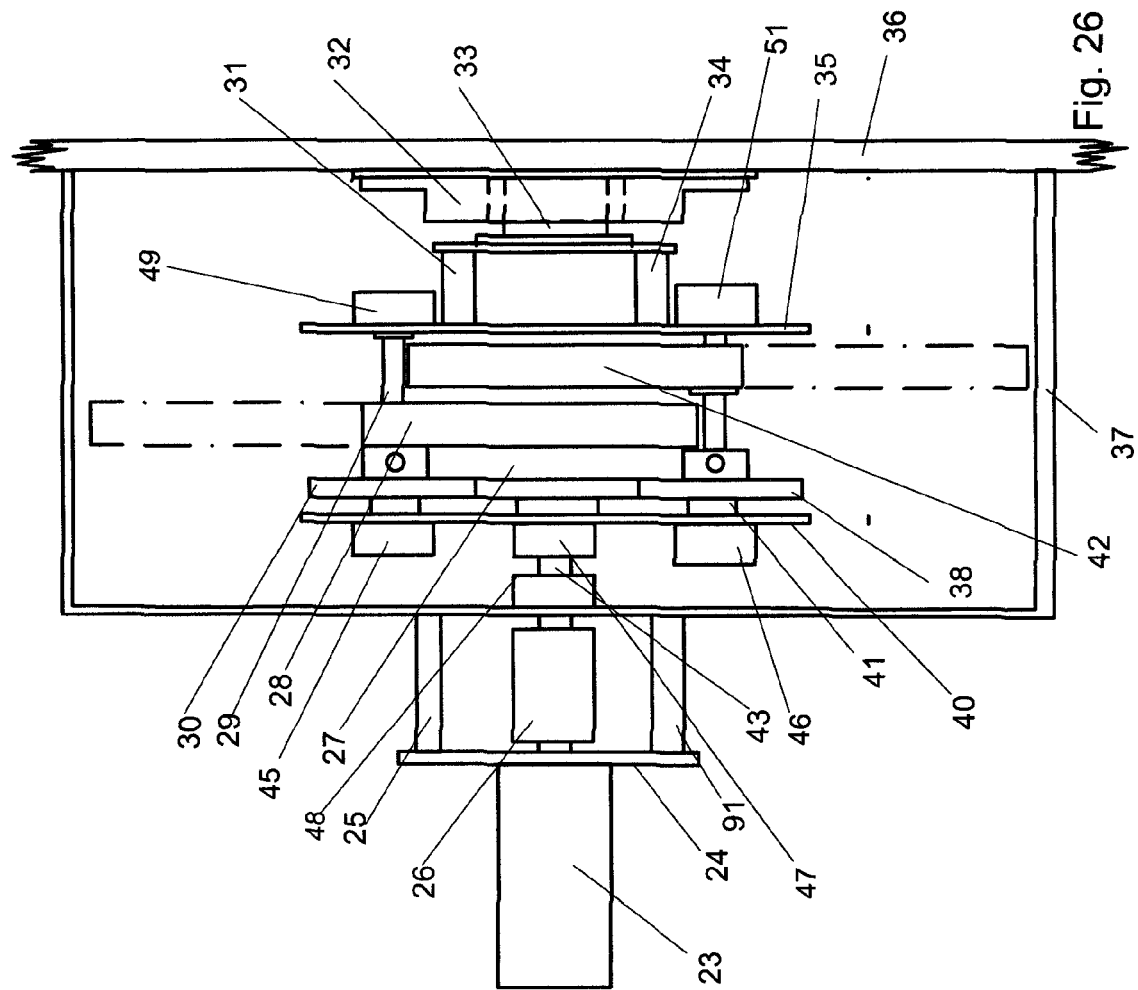

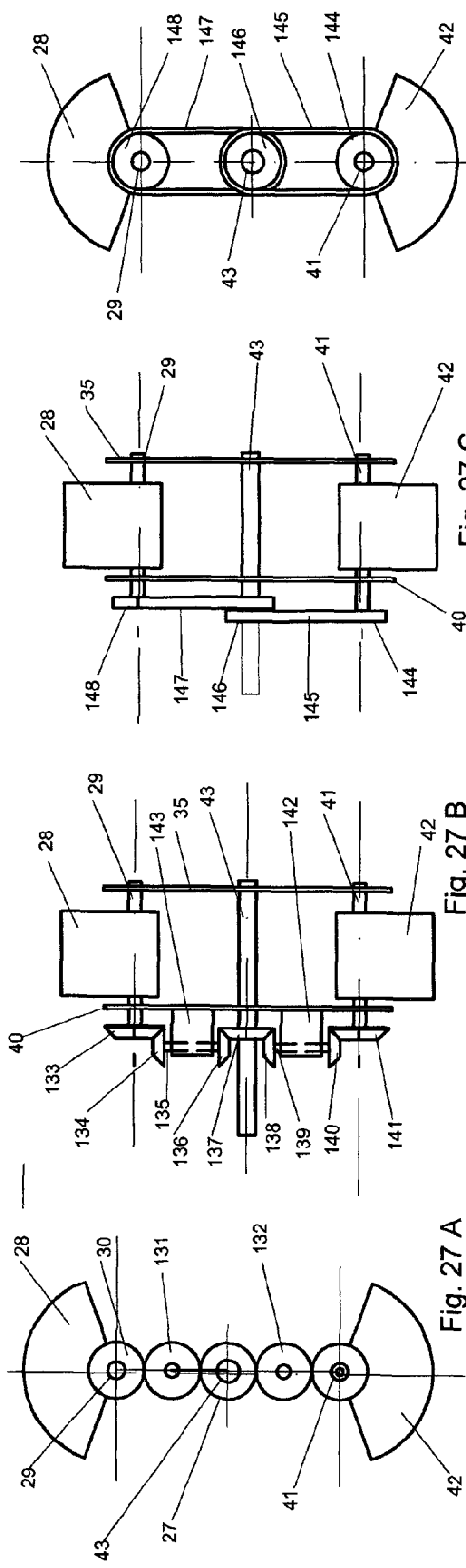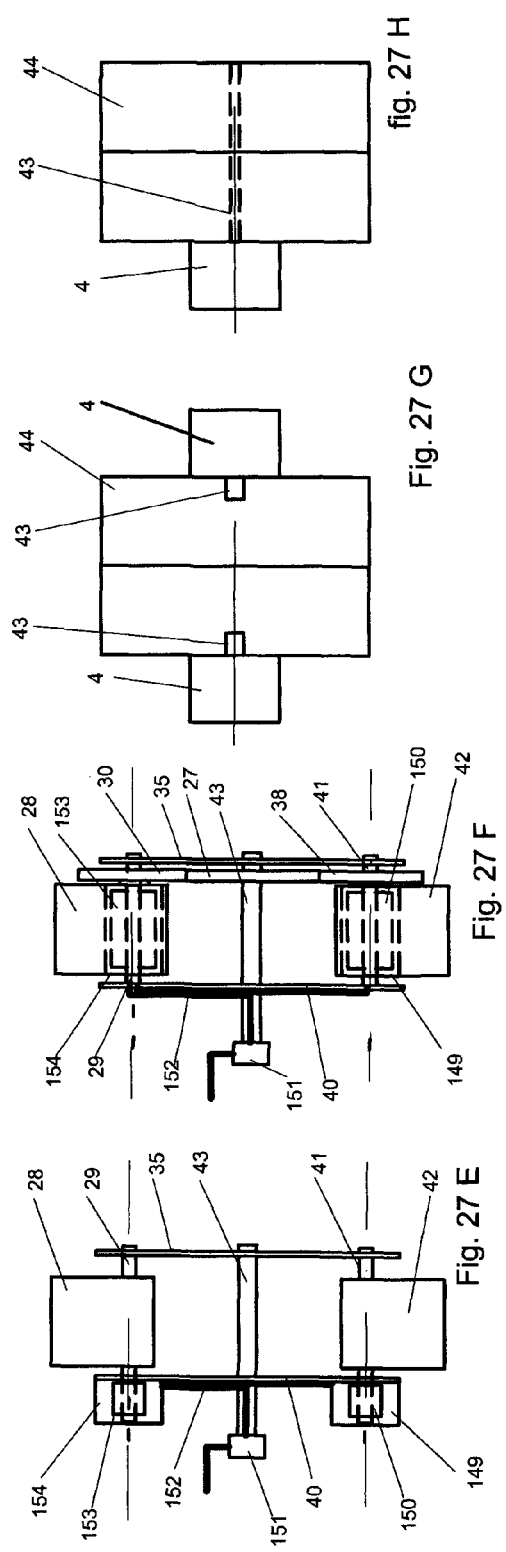

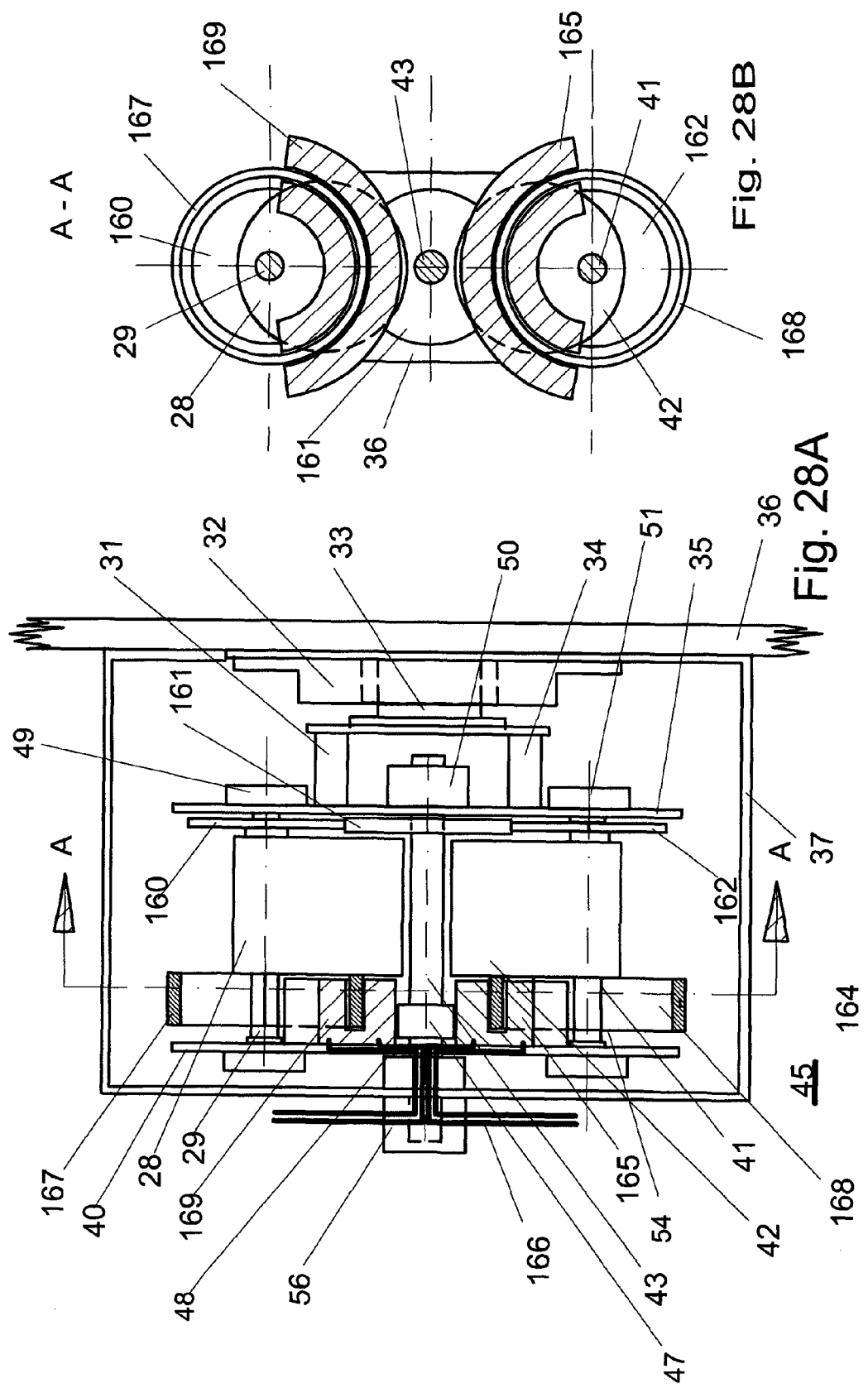

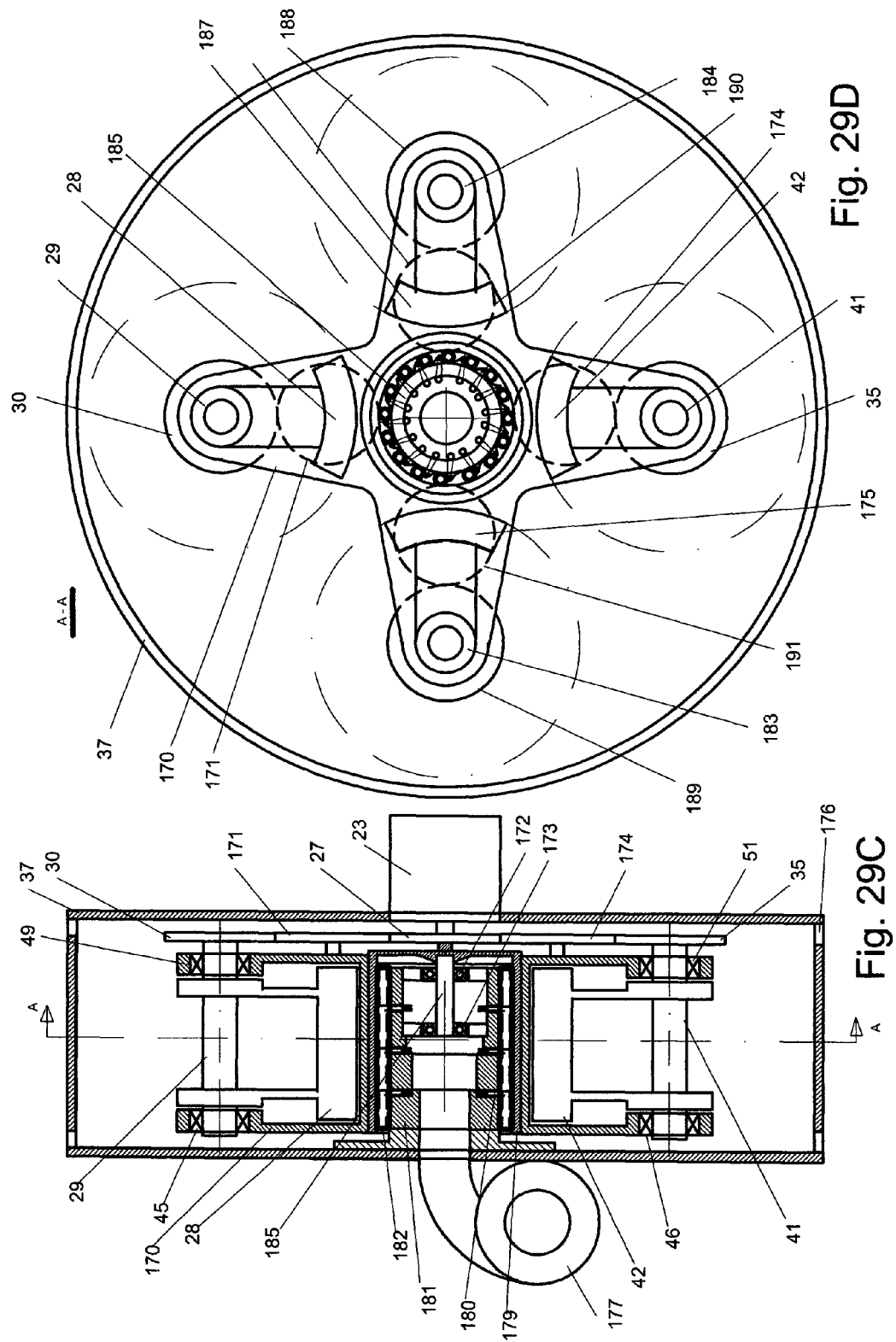

TORQUE AMPLIFYING APPARATUS AND SYSTEM

REFERENCE TO RELATED APPLICATION

This application claims priority to U.S. Provisional Patent Application No. 61/133,873, filed Jul. 3, 2008.

FIELD OF THE INVENTION

The invention relates generally to a system and apparatus using torque amplifying devices with unidirectional drives that can apply a torque to a body, such as that of a vehicle; in particular, the applied torque enables controlling the position, heading and/or the weight distribution of a vehicle. This control can be achieved without resorting to the physical properties of the surrounding environment, the ground, structure, water or air. The duration of the torque will be unlimited, and can continue until the conditions that produce it are intentionally changed.

There are many different applications for the torque amplifying device because they may be applied to any moveable object having a body capable of supporting the device and can be utilized on land, in the air, on or in water and in space. The benefits are many, including energy savings and improved performance of any body in which they are installed.

BACKGROUND OF THE INVENTION

To get a better understanding of the improvement of the invention, I will first describe a prior art device that cannot work to enable controlling the position, heading or the weight distribution of a vehicle. Typically, an assembly comprising an electric motor and gear box has an output shaft (e.g., drive shaft), both of which are supported by the body. The torque on the body from the drive shaft and the reaction torque of the motor and gear box are equal and counteract each other so that the net torque on the body is zero. In other words, this typical arrangement can have no permanent effect on the position, heading or the weight distribution of a vehicle. Thus, it will not enable controlling them.

There are both gyroscopic and centrifugal types of torque amplifying mechanisms. Each type has at least one rotary power source connected to the device and the output shaft drives, for example, a generator, a pump, a transmission or any other rotary machine. Such mechanisms are torque amplifiers, but are used in a way that will not produce any permanent net torque that can be used to control the position, the heading or the weight distribution of the body of a vehicle.

EP 0365896 by John G. Bolger and U.S. Pat. No. 2,033,343 to William James Larkin, describe centrifugal types. These patents describe mechanisms that drive rotary machines wherein there is no transfer of the net torque to the body supporting the mechanisms.

Also, U.S. Pat. No. 6,044,718, by William Lester, which describes a centrifugal type of torque amplifying mechanism. This patent illustrates a mechanism that drives a rotary machine, again without transfer of net torque to the body.

There are also known gyroscopic or centrifugal torque amplifying mechanisms which have outputs that oscillate with a linear function back and forth and use rack and pinion gears to convert the linear motion to rotating oscillating clockwise (CW) and counterclockwise (CCW) motion. There is also a type that has the oscillating function converted to a rotary CW/CCW function by a screw arrangement. All the devices show mechanisms that drive a rotary machine and provide no transfer of net torque to the body.

Also, as background is U.S. Pat. No. 5,603,239, to Kerwin D. W. Chong, entitled "Gyroscopic virtual counterweight for cranes". The device is described as transferring gyroscopic torque to the body of a crane to counteract the tilting moment when a heavy load is lifted. However, the gyroscopic device described has the torque oscillating CW/CCW on the body with no unidirectional drive shown. This is a big difference from the present invention.

Also of interest is U.S. Pat. No. 7,051,608, to Juan Jose Guerrero, which describes a gyroscopic system to reposition a body, but without any unidirectional drive—again, a great difference from my invention.

Similarly, US Patent Publication No. 2002-14507 by Douglas Shultz, doesn't appear to enable providing a torque for an indefinitely long time. There is no unidirectional drive that is transferring its torque.

However, if the torque amplifying mechanism were applied differently from these conventional mechanisms, as it is in the present invention, the result could be dramatically changed to provide a new utility. If its output were non-rotatingly connected to the body, then torque would be transferred to the body. The output torque would not be nullified by an equal torque from the drive motor. The invention achieves this highly useful effect.

BRIEF SUMMARY OF THE INVENTION

According to the invention, a torque amplifying mechanism and a driving motor sit on the same body, but the output torque from the torque amplifying mechanism is very much larger than the torque the drive motor produces, so a significant, continuous and controllable torque can be transferred to the body.

In a simple form, the invention provides a torque amplifying mechanism with its output shaft non-rotatingly connected to the body, so that its torque can affect the position, the heading and/or the weight distribution of the body of the vehicle in a manner that enables control of any or all of these aspects. With this as a fundamental principle, the invention has evolved into a number of different versions having numerous applications.

A version of the torque amplifying device has been successfully proven in practical experiments.

The torque amplifying devices of the invention may be applied to any moveable object having a body capable of supporting the device. They can be utilized on land, in the air, on or in water and in space to provide rapid or gradual control actions. The benefits are many. Importantly, they include significant energy savings as compared to conventional control means and enable improved performance of the body being moved.

The torque amplifying devices of the invention employ one or more output shafts associated with one or more unidirectional output drives, which can be non-rotatingly attached to a moveable body, such as a land vehicle, an aircraft, a water vehicle or a space vehicle. The whole body may turn, but the output relative to the body will remain fixed unless special couplings are used in special cases.

The torque amplifying devices of the invention which perform some kind of work and can be of centrifugal or gyroscopic type and have rotors that are made to spin, driven by one or more motors.

Differences between exemplary previously known designs and the present invention are illustrated in FIGS. 1 to 4. Of these, FIGS. 1 and 3A,B show known designs, while FIGS. 2 and 4 illustrate devices according to the invention.

FIG. 1 shows a known design where the objective is to drive some kind of rotary machinery. It is of a gyroscopic type and works with a spinning rotor held by gimbals. The inner part of the gimbals is made to spin, whereupon the outer gimbals will oscillate back and forth. The oscillating function is taken up by a unidirectional drive, which transfers the torque in one direction only to a rotary machine, which performs some kind of work, but no net torque is transferred directly to the body of a vehicle.

This is contrasted with FIG. 2, which shows a device of the present invention with output torque applied to the body of a vehicle so that the position and heading of the vehicle can be changed. Because there is no rotation between the unidirectional drive and the connection to the body, a net torque is transferred to the body of a vehicle.

FIGS. 3A, B show the previously known design of a centrifugal type of torque amplifying device. The centrifugal type of torque amplifying device works with eccentric rotors spinning so that centrifugal forces are produced. The centrifugal forces are taken up by a holder. The centrifugal forces are converted to an oscillating function. The oscillating function of the holder is taken up by a unidirectional drive, which drives a rotary shaft. The objective is to drive some kind of rotary machinery which performs some kind of work, but no net torque is transferred directly to the body of a vehicle.

See also FIG. 4, which shows the present invention of the centrifugal type. The output torque can be applied to the body of a vehicle, so that the position, heading and/or weight distribution of the vehicle can be changed. After the unidirectional drive, there is no rotation of the connection to the body, and a net torque can be transferred to the body of a vehicle.

So, FIGS. 2 and 4, which show the present invention, illustrate the enablement of control forces exerted on the body, which are not achieved by the prior art.

In the FIGS. 2 and 4 there would be an oscillating movement clockwise (CW) and counterclockwise (CCW) if the shaft were free to move without any unidirectional drive. However, a self-blocking unidirectional drive provided according to the invention prevents movement in the blocked direction. In essence, there will be a movement in the free direction and no movement in the blocked direction. As a consequence, there will be a transfer of torque to the body when the movement is blocked. The term "oscillating movement" as used in this description should be understood in that context.

The invention provides torque amplifying devices of the centrifugal and gyroscopic types, with the centrifugal type being chosen for description as exemplary of the invention. The principles that apply to the centrifugal also apply to gyroscopic types. Of primary importance to both types is the oscillating function as described briefly above and more completely below.

The torque amplifying devices of the invention have eccentric rotors that can be powered by one or more rotary power sources. In one alternative setup, a rotary drive motor is connected to a cogwheel that transfers the function to other cogwheels that are connected to the rotors. In another, there are several motors driving the rotors directly.

The useful rotary power sources will produce relatively small input torques and also minor reaction torques to the body. However, according to the invention, the input torque is amplified so the output torque applied to the body is much larger than the input torque and the reaction torque. Thus, the term "torque amplifying device" is used herein to describe the mechanisms of the invention.

A torque amplifying device of the invention produces an output torque on the body that is much larger than the reaction torque of a relatively small rotary power source connected to the body. Thereby, a high output torque is provided to work on the body.

The torque amplifying devices of the invention include output shafts that oscillate CW/CCW and are connected to an end of a unidirectional drive. The other end of the unidirectional drive is non-rotatingly connected to the body of a vehicle, either directly or with a linking means such as a shaft that is connected to the body. The unidirectional drive is used to transfer the torque to the body in one direction only. This is achieved by blocking movement of the drive in one direction, thereby transferring the blocked energy as torque to the body, but letting the drive run freely in the opposite direction with no transfer of torque to the body.

The non-rotating connection can have a torque limiting clutch to prevent a excessive torque from being transmitted. In this case, there can be a little movement, but that doesn't detract from the principle of a non-rotating connection. Also, shock absorbing springs can be used.

In a simple form, the torque which is transferred to the body is pulsating, with a gap between the pluses. This type of operation can be compared with a diode rectifying an alternating current as a so called "half wave rectification".

Desirably, two torque amplifying devices and two unidirectional drives are used to produce a torque. In this embodiment they are installed so the free running directions of each are in the same direction, with one running free while the other is blocked. In this arrangement, the combined torque will pulsate in a wave form, but the pulses will be in the same direction and will be continuous in the sense that there is no gap between the pulses. This type of operation can be compared to "full wave rectification".

The direction in which the unidirectional drives are freely rotated and blocked will determine whether a CW or CCW torque is transferred to the body.

Accordingly, there are several types of torque amplifying devices: (1) single acting, which can use one unit providing "half-wave" rectification; and (2) double acting, which can use two units for providing "full-wave" rectification.

The devices of the invention can provide a reversible function, which can switch between CW and CCW direction of the torque. This function can be single or double acting.

They can also provide an irreversible function, which will provide only one direction of torque, CW or CCW. This function can also be single or double acting.

The means to obtain unidirectional torque from an ocillating movement will require the use of a braking or clutch type mechanism to stop movement in one direction while permitting it in the other. In the case of a clutch means, a suitable device is known as overdrive clutch, and can be of any type, for example: spring clutch, roller clutch or ratchet wheel.

Instead of using a clutch means to provide unidirectional torque, it is possible to use a brake that is activated and deactivated during the oscillating cycles. When the oscillation goes in the desired direction, the brake is on and output shaft movement is blocked and a torque is transferred to the body. When the oscillation goes the other way, the brake is not active and the output shaft is free to move without transferring any torque to the body. The brake can be of any type for example: disk brake, drum brake, or the like. The brake can be activated in different ways, for example: by pneumatic, hydraulic, mechanical or electric means. When disk brakes are used, one or more calipers can be used with each brake.

Preferred devices according to the invention will include a speed sensor connected to the output shaft and a torque/force sensor, which is desirably connected to the brake. These and sensors are connected to a controller which receives signals representative of speed and/or torque/force, compares these to stored values, determines a suitable control response and sends a control signal to an actuator for the brake or other device to control the brake and/or other device. An advantage of this type of arrangement, is that the brake can be made to handle a high torque and that the function can be reversed, so it will transfer torque either CW or CCW, depending upon the signals from the controller. The contoller can determine whether CW or CCW direction is to be used and send appropriate signals to operate a switching means to cause movement in the direction determined.

In one exemplary case, the initial direction of movement will be CCW, and when the speed sensor senses that the speed of the output shaft has gone down to zero, the first half period starts. The speed sensor then sends a signal representative of zero speed to the controller. The direction of movement then goes from CCW to CW, and the brake is activated causing a CW torque to be transferred to the body. The torque/force sensor with the controller will maintain braking until the torque/force sensor gives a zero signal at the end of the second period. Thereafter, the cycle is repeated.

For CCW transfer of torque to the body, the second half period of the oscillation starts when the speed of the output shaft has gone down to zero. The speed sensor sends a signal to the controller when the motion goes from CW to CCW. The controller then sends a signal to activate the brake, and a CCW torque is transferred to the body. As long as the torque/force sensor senses the applied force, the controller sends signals to maintain braking. When the torque/force sensor gives a zero signal at the end of the second period, the cycle is repeated.

The controller can switch between CW and CCW function when there is a need to reverse the torque and a suitable instruction is given to the controller by means of programming or operator intervention.

The controller can modulate the degree of braking applied so that the amount of torque that is transferred can be controlled to any desired value. By modulating the braking, a torque limitation can be achieved.

The means for braking can include one or a plurality of brake calipers can be installed to one or more brake rotors.

There are physical limitations on braking mechanisms. For example, the maximum speed with which the brake can be operated is limited and the distance a brake caliper must move will cause a delay (lag). These and other limitations are taken into account by the programming of the controller and by mechanical design. It is preferred that the braking system be capable of high braking pressure and capacity and very short response time. It is preferred, that the distance the brake caliper must travel be as small as possible to facilitate short response times.

When a conventional self-blocking unidirectional drive is used, for example a roller clutch, spring clutch, ratching wheel, there is a limit to how much torque it can transfer. Also, excessive wear of the unidirectional drive will take place if the torque is too high. A torque limiting clutch can be installed either before the unidirectional drive or after it but before it is connected to the body. The torque limiting clutch can be of any type that limits the torque, for example a friction clutch.

In some applications, it is important to regulate the amount of torque applied to a body. The controller can be programmed to modulate the torque limit to vary the amount of torque that is transferred. A signal from a controller can be transmitted to an actuator, so the torque limit can be controlled. This is especially suitable for a rapid reduction of the torque. A more lengthy reduction can be achieved by regulating the speed of the motor.

The unidirectional drive can be offset from the central drive shaft, e.g., by cogwheels. For example, a drive cogwheel can be placed on the drive shaft and a cogwheel can be installed and driven by the drive wheel. The unidirectional drive can then be installed on this cogwheel. The advantage gained with this arrangement is easier service or replacement of the unidirectional drive. It is also possible to install a number of unidirectional drives to one torque amplifying device. The perimeter of the drive wheel can have a number of cogwheels and unidirectional drives.

Some designs transfer a very large torque and require a large diameter unidirectional drive. The unidirectional drive can be made with a hollow shaft in order to save material and weight. On some designs the shaft of the unidirectional drive has to be hollow to give place for a shaft, motor or any other part.

Normally the shaft goes inside the unidirectional drive; but when a hollow shaft is used, the piece with the locking parts can go inside the hollow shaft. This can be used as an alternative, or both an outside and inside placement of the blocking parts can be used. Thereby, a larger torque can be transmitted.

A brake can be used in conjunction with a unidirectional drive. The brake is mounted between the unidirectional drive and the body. The whole unidirectional drive is mounted so it can rotate if the brake is not active. When the brake is inactive it transfers no torque to the body because the whole unidirectional drive can move freely. When the brake is made active it transfers the torque to the body when the torque acts in the torque transferring direction.

When the torque that is transferred to the body shall be made to change between CW or CCW function two unidirectional drives can be connected with two brakes. The torque acts so that a turning action on the body takes place. I will have a CW or CCW action.

When the brake that is active the unidirectional drive will function normally and it can either free-wheel or transfer the torque to the body. When the brake that is inactive the unidirectional drive will just rotate with the shaft and no torque is transferred to the body.

The brakes are connected to a controller which can supply power to the brake cylinder. The controller decides which brake is active. Only the unidirectional drive that has an active brake is transmitting torque. The other unidirectional drive is free to run in any direction. When the first brake is active it transfers a CW torque. When the second brake is active it transfers a CCW torque. When none of the brakes are active no torque is transferred.

The rotary power source can be of any suitable type. It can for example be a combustion motor, an electric motor, a hydraulic motor, or a compressed gas motor, for example.

When a double torque amplifying device is used the torque pulses are phased so they do not overlap. The torque pulses from the first and second torque amplifying devices come in a direct sequence.

More than one torque amplifying devices can be used as individual devices or built together.

The phasing of the rotors is important. When one rotary motor is used together with a cogwheel transmission the phasing is controlled when the torque amplifying device is assembled.

When one torque amplifying device is assembled the eccentric rotors are in the same phase.

When two torque amplifying devices are assembled, the first has one phase and the second device has the opposed phase.

It is for example done so that the eccentric rotors are at the inner position at one torque amplifying device and at the outer position at the other torque amplifying device. They are separated 180 degrees.

When more than one motor is used synchronization is important. Two or more synchronous motor can be used or one regular electric motor and slave motors that follows the first motor with respect to speed and phase angle. The first motor is a servo motor with a servo system controlling the other motors.

With the expression "different types" of unidirectional drives means drives for CW function is one type and CCW function is a different type.

When double acting torque amplifiers and irreversible function is used only one direction of torque is needed the same type of unidirectional drive is needed. This means two of the same type unidirectional devices for the double torque amplifying device. It is the installation of the unidirectional device that decides the direction of the torque CW/CCW.

When double acting torque amplifiers and reversible function are used, one CW and one CCW of the unidirectional devices are needed for each device.

The shaft of the unidirectional device can be directly connected to the holder of the eccentric rotors or the outer gimbals.

The torque can be applied so it acts on any of the axis of a body depending on the orientation of the mechanism. The orientation of the mechanism is defined by the unidirectional drive trough which a centerline can be drawn.

The torque acts so that a turning action on the body takes place. It will have a CW or CCW action.

The torque can be CW or CCW depending upon the orientation and the type of the unidirectional drive.

The centerline of the unidirectional drive can be applied parallel to the length axis of the body and cause a rolling function on the body from side to side.

It can be applied horizontal and perpendicular to the length axis of the body so it causes the body to lean forward or backward, or to change the load distribution of a front axis and a rear axis of a vehicle.

It can also be applied to the vertical axis of the body so it is turned and the heading of the body is controlled.

A controller can select the direction of the torque. CW, CCW or no torque is transmitted.

In order to get a smooth transfer of the torque, dampening devices such as springs or resilient support members could be used. It will dampen the fluctuations of the torque pulses and avoid to strong vibrations.

An object of the invention is to apply a torque to a body so its position or heading is controlled.

An additional object is to regulate the size of the torque.

The size of the torque is very much dependant on the speed of the motor. Therefore a speed controller will also control the torque.

By using double acting torque amplifier devices with a reversible function a continuous control of the size of the torque CW and CCW can be achieved. This is done by letting one device operate CW and the other device operate CCW torque work against each other. They operate in opposite directions, so when they have the same speed the torques of the two devices neutralize each other.

When you want a change of the size of the torque, the speed is increased on one device and decreased on the other. A net CW or CCW torque is produced proportional to the difference of the square of the speed of the two devices.

When one of the devices is at zero speed and the other is a maximum speed and if a greater torque is needed the device which is at zero switches its direction of the torque so both devices work in the same direction. The speed of the device that is switched is varied from zero to the maximum speed. There by the double torque is produced.

There is in many cases a need to control the position and the heading of a body. It can for example be subject to unwanted torque that changes the body's position and heading. The invention applies to all bodies that have that need.

There are a number of slightly different torque amplifying devices, but the principle is the same. Some are best for small torque and some are best for large torque.

There are some special applications that need special attention.

Helicopter

In one application, a torque applifying device of the invention is used to prevent the vertical turning action (roll) of the helicopter because of dissymmetry of lift when it flies forward. When a helicopter flies forward the velocity of the air-stream causes a dissymmetry in lift. One part of the main rotor moves up against the wind, and the other part moves with the wind. This is compensated for by using a variable angle of attack of the blades, so the lift becomes equal. When the speed of the helicopter is increased we will have to increase the angle of attack on the retreating blade. If the angle of attack is increased too much, there is a risk for stalling of the retreating blade. This must never happen because the helicopter will overturn. This means that the helicopter has a maximum speed that must newer be exceeded.

This problem can be eliminated by a counter acting vertical turning action (roll) by a horizontally mounted torque amplifying device according to the invention. It produces a torque that counteracts the rolling torque the dissymmetry of lift causes. The torque need only be produced in one direction only. It can be controlled by a regulator, which has for example an inclination sensor and/or gyro. The type of torque amplifying device can be single acting and with irreversible function, but double acting is preferred.

Because of the lift is complimented by the torque amplifier the angle of attack of the retreating rotor blade can be kept less with the invention. This means that a smaller amount of energy is used to move the main rotor of the helicopter. This will reduce the fuel consumption.

A helicopter with a single main rotor has a tendency to spin due to the reaction torque generated by the main rotor. On the current helicopters it is counter acted by the torque produced by a tail rotor. The heading of the helicopter are controlled, by adjusting the angle of attack of the tail rotor.

The invention makes it possible to use the torque amplifying device and produce a torque that counteracts the spinning torque of the helicopter. By using more or less torque, the heading of the helicopter is controlled. The torque need only be produced in one direction only. This means that the tail rotor can be eliminated.

The type of torque amplifying device can be single acting and with irreversible function, but double acting is preferred.

On a conventional helicopter the tail rotor is powered by a takeoff from the main engine which drives the main rotor drive. It takes usually 10-20% of the engine power to operate the tail rotor. This can be eliminated by using a vertical torque amplifying device instead of the tail rotor. The power consumption of the vertical torque amplifying device is much less than the tail rotor. It can be controlled by a regulator which has a sensor with a compass and/or gyro.

Noise generated by the tail rotor is also a significant factor. This can be solved if the tail rotor is eliminated, by the torque amplifying device according to the invention.

Safety is also a concern. The tail rotor is dangerous to people nearby the helicopter. The tail rotor can easily be damaged by different objects when flying low. This often results in a severe crash. This can be eliminated by using the torque amplifying device instead of the tail rotor.

Shipping Containers

A shipping container needs to be moved between different places using a crane.

A spreader is a rectangular frame which has cables attached. The cables connect the spreader to the crane. The spreader is attached or disconnected to a container with a quick connect coupling. To move the container the first that has to be done is first lining up the spreader with the container. When the container is connected to the spreader it can be lifted and moved.

There is a need to turn the container around, so it can line up with the place it will be put down. For example, a truck bed. It is hard to turn the container with the crane, if only one cable is used to the crane.

The turning can be solved by a vertical torque amplifying device according to the invention. It is applying its torque to the spreader. The number of cables the crane is using is not an important factor. One line can be used, which simplifies the crane design. The torque need only be produced in one direction only, because the natural twist of the cable will provide a turning action in one direction. However, a torque amplifying device that is reversible is preferred. Single and double acting torque amplifiers can be used. The torque amplifying device can be controlled by a regulator, which has a sensor with a compass and/or gyro.

Water-Based Bodies

Bodies that are supported on or in water can be effectively controlled by torque amplifying devices according to the invention.

Improvements are possible according to the invention. For example, the rudder on a ship for steering is usually placed in the wake of the propeller. This causes a substantial hydrodynamic drag. The rudder has an impact on the total propulsive efficiency. The ship would be much faster and the fuel consumption would be less if the rudder did not exist. Also, the rudder is ineffective at very low speeds and the ship needs tugboats to navigate in tight harbors.

By using a vertical torque amplifying device that can produce a CW or CCW torque the rudder can be eliminated or complimented. Together with the propulsion force of the propeller, the ship will make a left hand or a right hand turn. The preferred type of torque amplifying device is double acting and reversible function. It is controlled by a regulator, which has a sensor with a compass and/or gyro.

To completely eliminate the rudder is possible on a ship. On a large ship it would require a very large and strong torque amplifying device. It requires millions of Newton meters (Nm) to turn a ship, but it is possible. It is a question of designing sufficiently large torque amplifying device. Also a number of devices and be used on the same ship.

The risk for damages to the rudder is eliminated by using the torque amplifying device. This is important for naval vessels.

As an option a not quite as big torque amplifying device could be used in conjunction with a rudder. The rudder should be designed for high speed maneuvers and not the low speed region. This would make the rudder smaller and cause less drag. The low speed maneuvering will be handled by the torque amplifying device. Thereby the propulsive efficiency would be improved and the fuel consumption would be less.

The improvements in the fuel economics are substantial when the rudder is reduced or eliminated. The power needed to operate the torque amplifying device is insignificant compared to the all over power saved.

The improvements provided by the invention can be applied to all water-based bodies to control movements along one or more axes.

Hovercraft

A hovercraft can have a vertical mounted torque amplifying device installed according to the invention. The torque amplifying device needs to produce CW and CCW torque. Thereby the position of the hovercraft can be changed, controlled by a regulator, which has a sensor with a compass and/or gyro. The type of torque amplifying device needed is double acting and reversible function.

Automobiles

An automobile has a variable loading on the front and rear wheels as it accelerates or is braking. This because of the dynamic forces that acts on the car when it changes its speed. For example, the load decreases on the front wheels when a car accelerates. If the car has front-wheel drive there is risk for wheel spin when the car accelerates. This can be eliminated by a torque amplifying device according to the invention.

The torque amplifying device adds a torque in such direction, that the force increases at the front wheels as the car accelerates. The torque amplifying device is mounted horizontal and perpendicular to the center line of the car. The torque is preferably CW and CCW, and can be controlled by a regulator with for example an acceleration sensor.

When a car is braking there is an increase in the loading of the front wheels and a reduction in the rear wheels. The breaking effort on the front wheels will increase and the breaking effort on the rear wheels will be reduced. This will lead to an uneven brake loading between the front and rear wheels. It can even lead to that the rear wheels lock up. This can be eliminated by a torque amplifying device according to the invention mounted horizontal and perpendicular to the center line of the car. The torque amplifying device adds a torque in such direction, that the force increases at the rear wheels as the car brakes. It can be controlled by a regulator, which has for example an acceleration sensor.

The preferred type of torque amplifying device is double acting and reversible function.

This torque amplifying device according to the invention can also be used to stabilize a car making a turn. A counter torque to the tipping torque the centrifugal forces is produced by the torque amplifying device. The torque amplifying device is mounted horizontal and in line with the length line of the car.

When a car is designed the weight distribution between the front and rear axle is an important consideration. The weight distribution of the car can be corrected by the torque amplifying device according to the invention. It can add to or reduce the load at the front or rear axle as needed depending upon the direction of the torque.

The preferred type of torque amplifying device is double acting and reversible function.

It can be controlled by a regulator, which has for example an acceleration sensor and/or an inclination sensor and/or gyro.

Also, when a car is loaded with people and luggage the weight distribution can be changed so it becomes unsuitable. This can be corrected by the torque amplifying device according to the invention. This is especially important when lighter cars are designed. The lighter the car is the more the loading will impact the weight distribution. The weight is a very important factor when fuel efficient cars is designed.

All-Terrain Vehicles

An all-terrain vehicle (ATV) that has been caught in a ditch and is having a hard time to come loose. It will require help from other vehicles, which it time and resource consuming. The whole effort takes a lot of fuel. This can be solved by the torque amplifying device according to the invention mounted perpendicular to the center line of the car. By producing a counter torque the vehicle can be righted. The preferred type of torque amplifying device is double acting and reversible function.

The amount of torque is controlled by a regulator, which has for example an acceleration sensor and/or an inclination sensor and/or gyro.

Motor Cycles

A motor cycle has the same problem as the automobile or terrain vehicle. This can be eliminated by the torque amplifying device according to the invention mounted perpendicular to the center line of the cycle. The preferred type of torque amplifying device is double acting and reversible function. It can be controlled by a regulator, which has for example an acceleration sensor and/or an inclination sensor and/on gyro.

Wheel Loaders

On a wheel loader there is a need to redistribute the load between the front wheels and the rear wheels. Otherwise there is a risk for tipping forward when a high load is taken in the scoop. Today problem of load distribution is solved by a very heavy counterweight on the rear of the loader. This increases the weight of the wheel loader which slows down the machine and increases the fuel consumption. This can be eliminated by the torque amplifying device according to the invention. It is mounted horizontal and perpendicular to the center line of the machine and it works as an artificial counter weight. Single acting and irreversible function can be used but, the preferred type of torque amplifying device is double acting and reversible function.

It can be controlled by for example regulator with for example; acceleration, inclination or force sensor or gyro.

Fork Lift Truck, Cranes and Excavating Machines

The tipping load when a fork lift truck or a crane or an excavating machine will lift a load is counteracted by a torque amplifying device according to the invention. It is mounted horizontal and perpendicular to the center line of the machine. It works as an artificial counter weight. The preferred type of torque amplifying device is double acting and irreversible function.

It can be controlled by for example regulator with for example; acceleration, inclination or force sensor or gyro.

Airplanes

An airplane or a missile uses number of control surfaces in order to maneuver the plane or the missile.

The surfaces in question are the vertical stabilizer, horizontal stabilizer, rudder, elevators and ailerons. They are very costly and heavy, especially when you take into account the servo motors and controls.

The control surfaces are not very effective when the air speed is low. Above all, the control surfaces give cause to a lot of aerodynamic drag. Without the control surfaces the aero plane could fly faster, take larger payload and a reduction in the fuel consumption. According to; http://www.warbirdforum.com/northrp2.htm.

Much is gained if for example; the vertical stabilizer and rudder is replaced or reduced in size.

The improvements are possible if torque amplifiers according to the invention are used. The torque amplifiers are mounted vertical, horizontal and perpendicular to the center line of the plane. It can be controlled by for example regulators for acceleration, inclination or force sensor or gyro, for example. Together with the propulsion force of the main driving force the aircraft will make a left hand or a right hand turn.

The vertical torque amplifier can replace the vertical stabilizer and the rudder.

The horizontal and perpendicular torque amplifier can replace the horizontal stabilizer and elevators.

The horizontal and in line torque amplifier can replace the ailerons.

All torque amplifiers are of the type double acting and reversible function.

VTOL (vertical take off and landing) and STOL (short take off and landing) aircraft will benefit from using the torque amplifying devices according to the invention. Especially, at low speed the normal control surfaces are ineffective. A turnable jet that provides the lifting function is sometimes substituted by nozzles or lift fans in the current designs that keeps the aircraft stable. These fans or jets can be replaced by the torque amplifying devices according to the invention The aircraft will be stabilized by using the torque amplifying devices according to the invention.

The torque amplifiers are preferably of the type double acting and reversible. They are regulated by a number of controllers. VTOL (vertical take off and landing) and STOL (short take off and landing) aircraft will benefit from using the torque amplifying devices according to the invention. Especially, at low speed the normal control surfaces are ineffective. A turnable jet that provides the lifting function is sometimes substituted by nozzles or fans in the current designs that keeps the aircraft stable. These fans or jets can be replaced by the torque amplifying devices according to the invention.

The improvement of economics when operating an airplane could be substantial and new types of airplane could be designed.

The control surfaces could be eliminated fully, or reduced in size when torque amplifiers are used according to the invention. This would result in a decrease in the fuel consumption and increase in speed. All torque amplifiers are of the type double acting and reversible function.

Torque Amplifying Devices.

The torque amplifying device can be of a variety of sizes, from a very small device for a toy car with a fractional torque of one Nm (Newton meter) to a large ship where the torque can be several millions of Nm.

The torque amplifying device doesn't need to be very large to be effective and produce a torque that is significant.

The size of the torque varies with the power of two with the revolutions (RPM).

The size of the torque varies with the power of five if all dimensions are changed equally.

Multiple torque amplifier devices can be used to get a stronger effect. This applies to all the applications listed above.

If more than one torque amplifier is used to control the body in one plane, the torque amplifiers can be mounted with the axis of the unidirectional drive in line or in parallel side by side.

The torque amplifier of the invention is just as effective at low velocities of the body as it is a high velocities.

BRIEF DESCRIPTION OF THE DRAWINGS

The accompanying drawings, which are incorporated in and constitute a part of the specification, illustrate presently preferred embodiments of the invention, and together with the general discription given above and the detailed description of the preferred embodiments given below, serve to explain the principles of the invention. As shown throughout the drawings, like reference numerals designate like or corresponding parts.

FIG. 1 is a schematic front elevation of a previously known technology, wherein a gyroscopic device is employed to run a rotary machine.

FIG. 2 is a schematic front elevation of an application of the new technology of the invention, showing a gyroscopic device with its torque transferred to a body thereby, transfer a torque to a body and thus control the position of the body.

FIG. 3A is a schematic front elevation of a previously known technology, wherein a centrifugal device is shown running a rotary machine.

FIG. 3B is a side elevation view, also schematic, of the device shown in FIG. 3A.

FIG. 4 is a schematic front elevation of a new application of the technology according to the invention, wherein a centrifugal device with eccentric rotors is shown transferring its torque to a body, thereby controlling the position of the body.

FIG. 5 is a schematic sectional side elevation view of a torque amplifying device applied to the body of a helicopter. The helicopter has no tail rotor. The orientation of the center line of the unidirectional drive is vertical. Thereby transferring a horizontal torque to the helicopter and preventing the spin of the helicopter. The heading can be controlled by increasing and decreasing the torque.

FIG. 6 is a schematic sectional side elevation of a torque amplifying device applied to the body of a helicopter. The orientation of the center line of the unidirectional drive is in parallel with the center line of the helicopter. Thereby, a vertical torque is applied to the helicopter and the roll of the helicopter is controlled.

FIG. 7A is a schematic sectional front elevation of a shipping container fastened to a spreader, wherein the spreader has a torque amplifying device applied to the frame of the spreader. The orientation of the spreader can be controlled by increasing/decreasing the applied torque. The orientation of the center line of the torque amplifying device is vertical.

FIG. 7B is a schematic top plan view of the container and the spreader shown in FIG. 7A, wherein the torque amplifying device is shown.

FIG. 8A is a schematic sectional side elevation of an automobile with a torque amplifying device of the invention applied to the body of the automobile, wherein the automobile has front wheel drive and is accelerating. The orientation of the center line of the torque amplifying device is perpendicular to the center line of the car. Thereby, the torque amplifying device can provide a torque so the front axle so wheel-spinning is reduced. There is also a torque amplifying device oriented in line with the center line of the vehicle, so it can produce a torque counteracting the tipping torque that is caused by the centrifugal forces when the car turns.

FIG. 8B is a schematic sectional side elevation of an automobile with the torque amplifying device applied to the body of the automobile during braking. The orientation of the center line of the torque amplifying device is vetically perpendicular to the front to back center line of the car. Thereby, the load of the rear axle is increased so the wheels don't lock up. There is also a torque amplifying device oriented in line with the center line of the vehicle, so it can produce a torque counteracting the tipping torque that is caused by the centrifugal forces when the car turns.

FIG. 9A is a schematic sectional side elevation of an automobile with the torque amplifying device applied to the body of the automobile. The orientation of the center line of the torque amplifying device is perpendicular to the center line of the car. The car runs on plain ground and the torque amplifying device is not active.

FIG. 9B is a schematic sectional side elevation of an automobile with the torque amplifying device applied to the body of the automobile. The orientation of the center line of the torque amplifying device is perpendicular to the center line of the car. The torque amplifying device is running CW so a torque is applied lifting the front wheels. Double acting torque amplifying device is used.

FIG. 9C is a schematic sectional side elevation of an automobile with the torque amplifying device applied to the body of the automobile. The orientation of the center line of the torque amplifying device is perpendicular to the center line of the car. The torque amplifying device is running so the rear wheels are lifted. Double acting torque amplifying device is used.

FIG. 11 is a schematic sectional side elevation of a crane with the torque amplifying device applied to the body of the crane. The orientation of the center line of the torque amplifying device is perpendicular to the center line of the crane. It can produce a torque that will counteract the tiling torque of the load the crane is lifting.

FIG. 12 is a schematic sectional side elevation of an excavation machine with the torque amplifying device applied to the body of the machine. The orientation of the center line of the torque amplifying device is perpendicular to the center line of the machine. It can produce a torque that will counteract the tilting torque of the load in the scoop.

FIG. 12 is a schematic sectional side elevation of an excavation machine with the torque amplifying device applied to the body of the machine. The orientation of the center line of the torque amplifying device is perpendicular to the center line of the machine. It can produce a torque that will counteract the tiling torque of the load in the scoop.

FIG. 14A is a schematic side elevation of an airplane with torque amplifying devices applied to the body an airplane. Here, three torque amplifying devices are applied vertical, horizontal and perpendicular so the plane can be controlled with respect to roll, pitch and heading. Double acting torque amplifying devices are shown, and the airplane is depicted without control surfaces.

FIG. 14B is a schematic top plan view of the airplane shown in FIG. 14A.

FIG. 18A is a schematic graph illustrating the torque output of a single torque amplifying device.

FIG. 18B is a schematic graph illustrating the torque output of a double torque amplifying device. It also shows the effective torque.

FIG. 19A is a schematic side elevation of a single torque amplifying device with the unidirectional drive offset from the central drive shaft to facilitate easy service or replacement of the unidirectional drive. A second unidirectional drive is shown.

FIG. 19B is a schematic sectional front elevation view taken along line A-A of FIG. 19A.

FIG. 20A is a schematic side elevation of a brake with a unidirectional drive.

FIG. 20B is a schematic front elevation of the device of FIG. 20A.

FIG. 22 is a schematic side elevation of a single acting torque amplifying device with reversible function. The brake controls the unidirectional drives. There are motors driving the rotors.

FIG. 23 is a schematic side elevation of a double acting torque amplifying device with reversible function. The brakes control the unidirectional drives. There are motors driving the rotors.

FIG. 26 is a schematic front elevation of a torque amplifying device with a divided center shaft, so the radius of the eccentric rotors can be increased.

FIGS. 27A through 27H illustrate several alternative modifications including cog wheels and transmission devices.

FIG. 28A shows a single torque amplifier in a sideview cross section with a special type of motor that can supply a large torque to the eccentric rotors.

FIG. 28B shows a cross section of the same as in FIG. 28A.

FIGS. 29C and 29D show a modified torque amplifying device according to the preferred embodiment.

DETAILED DESCRIPTION

Figure 10:
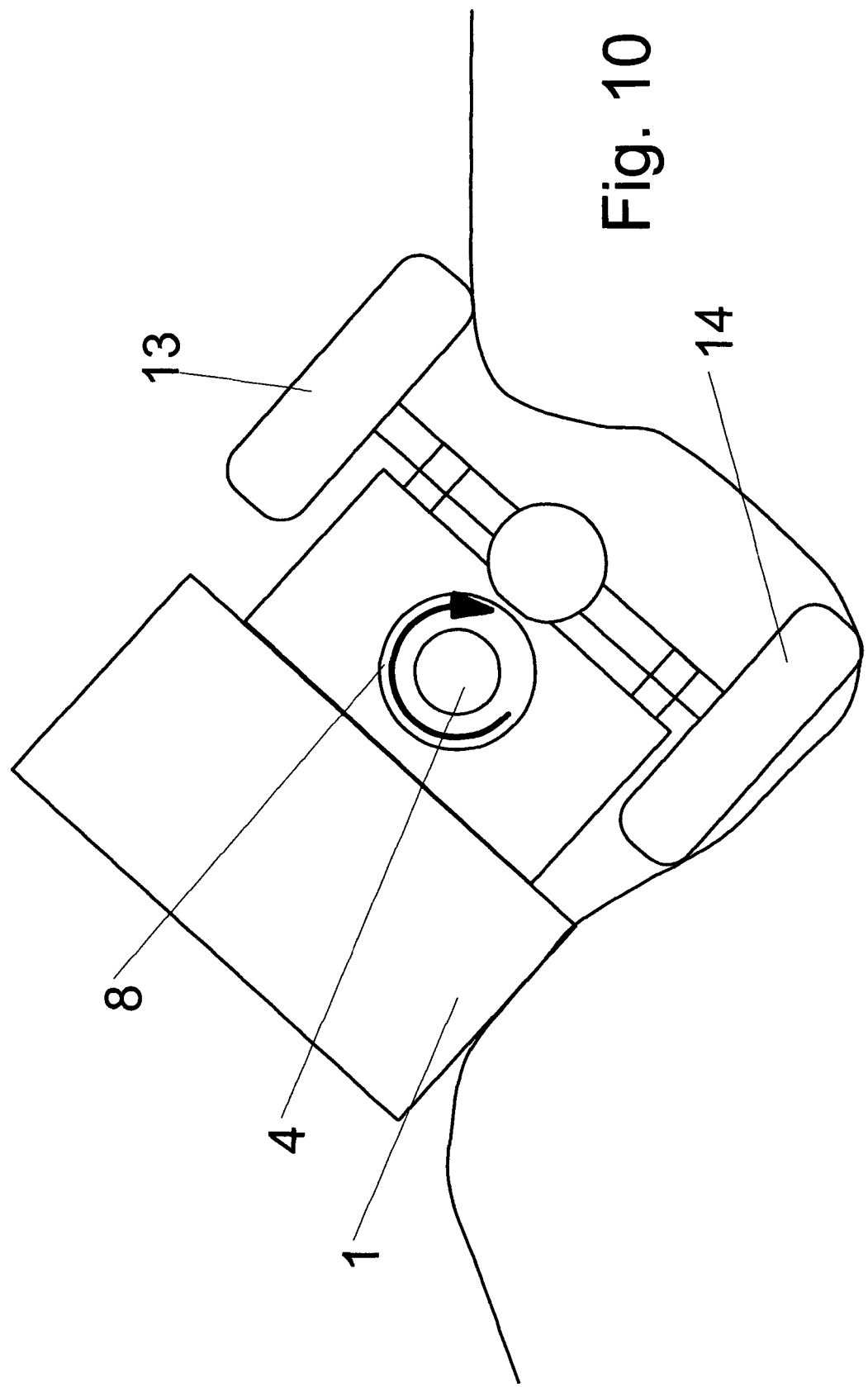
FIG. 10 is a schematic sectional front elevation of a vehicle that has overturned. The orientation of the center line of the torque amplifying device is in line with the center line of the vehicle. Double acting torque amplifying device is used. It can produce a torque that will tend to right the vehicle.

In describing the present invention, reference is made to the drawings, and a generalized description will be given first with regard to an aircraft, but it will be understood that the invention applies as well to land and water-operated vehicles as well as spacecraft. The invention has application to any body capable of holding one or more of the devices of the invention.

The position of any device employing the invention can be defined and changed with reference to three parameters, which define rotations in three dimensions around the vehicle's coordinate system origin, the center of mass. The machanisms of the invention can be employed to alter any or all of these to achieve control. These angles are pitch, roll and yaw. FIGS. 5 and 6 illustrate these in the context of a helicopter.

FIG. 5 shows a side elevation of a body of a helicopter 1 with a single main rotor 2. And, FIG. 5 shows a front elevation of a body of the helicopter 1.

Pitch is depicted as rotation around the lateral or transverse axis, i.e., an axis running from the pilot's left to right in piloted aircraft, and parallel to the wings of a winged aircraft. I show this as the x-axis, and as the nose pitches up about the x-axis, the tail moves down, and vice-versa.

Roll is depicted as rotation around the longitudinal axis, i.e., an axis drawn through the body of the vehicle from tail to nose in the normal direction of flight, or the direction the pilot faces. I show it as the y-axis. The roll angle is also known as bank angle on a fixed wing aircraft, which "banks" to change the horizontal direction of flight.

Yaw is rotation about the vertical axis, i.e., an axis (here, the z-axis) drawn from top to bottom, and perpendicular to the other two axes.

These orientations will be used as guides and will aid in understanding the various torques applied according to the invention to control the position, the heading or the weight distribution of the body of a vehicle.

In the simplest case according to the invention, motive force for a vehicle will be applied for movement along a single axis, typically applied along the long axis, the y-axis; however, the invention is meant to apply also to mechanisms where the direction of a propulsion force can be varied, as in the case of a water-jet-powered boat where the jet is typically rotated about the vertical axis. Also, as an example is a vertical take off aircraft where the thrust jets can be made moveable about the x, y or z axes. In addition, certain specialty land vehicles will be provided with controllable drives for individual wheels. Thus, the cases presented below are to be understood as describing a version simplified for explanation, but are not limited to the single axis thrust described.

I refer to FIG. 5, which shows a front view of a body of helicopter 1 with a single main rotor 2 consisting of advancing rotor blade(s) 6 and retreating rotor blade(s) 5. It is important to notice that the helicopter 1 has no tail rotor. The torque amplifying device 3 is driven by a rotary motor 4. The torque amplifying device 3 produces counter torque to the reaction torque of the main rotor 2. The center line of the torque amplifying device 3 is vertical and along the z-axis, so the torque will act in the horizontal plane. A controller 23 regulates the torque so that spin is counteracted and the heading is controlled.

The controller 23 can be provided for any vehicle (broadly, herein, the term vehicle is intended to include any device in need of controlled movement) for which the torque amplifying device of the invention is to be employed and preferably comprises a programmable digital processor. The processor is enabled to receive input signals from one or more sensors. Any known, suitable sensor can be employed to assess the orientation of the vehicle and its surroundings. For example, sensors can be located on the vehicle to provide signals indicative of vehicle motion and/or changes in location of the vehicle. Sensors can also be included to sense obstacles or other anomalies in the environment and may take the form of purely electromechanical devices or transducers or may involve video elements. Sensors can also be employed on the torque amplifying device to provide signals indicative of parameters relating to its state of operation, especially the drive shaft speed and the direction and degree of drive shaft torque. The Processor compares one or more input signals to predefined criteria, calculates the need for control action by the torque amplifiying device, determines the nature and degree of control actions and generates output signals to control the operation of the torque amplifying device. The control signals for the torque amplifying device can be associated also with control signals to operate other vehicle systems, such as speed control and the like. Also, a temperature sensor can be employed to avoid excessively high temperatures in the unidirectional drive or related parts. Alternatively, the controller 23 can comprise a suitable analog device. In each of the exemplary embodiments a controller like 23 or equivalent is desirably employed.

The torque amplifying device 3, employed in this manner, makes it possible to eliminate the usual tail rotor on the helicopter 1.

As illustrated in FIG. 6, when the helicopter 1 is moving forward, the airspeed across the rotor blades 5 and 6 to will be unequal. In the example shown, the retreating right rotor blade 5 gives less lift and the advancing left rotor blade 6 more lift. This causes a rolling torque on the helicopter 1. This torque is counteracted with a torque amplifying device 3 which has a rotary motor 4. The center line of the torque amplifying device 3 is horizontal and parallel to the horizontal, front-to-back centerline (y-axis) of the helicopter 1, so the torque will act in the vertical plane. If the vertical torque of the rotor 2 of the helicopter 1 acts CW, while the torque amplifying device 3 acts CCW, the tendency to roll of the helicopter 1 is controlled by torque amplifying device 3 in response to control signals from the controller 23.

Refer now to FIG. 7A, which is a side elevation view of a shipping container 96 fastened to a spreader 9. The spreader 9 has a torque amplifying device 3 applied to the frame of the spreader 9. The torque amplifying device 3 is driven by a rotary motor 4. The spreader 9 is suspended by cables 10. The cables 10 are operated by a crane (not shown). The torque amplifying device 3 is double acting can apply a CW or a CCW torque to change the position of the spreader 9 and the suspended container 96.

Then, in FIG. 7B, there is a top plan view of the shipping container 96 that is fastened to a spreader 9. The orientation of the center line of the torque amplifying device 3 is aligned with the vertical or z-axis so that the torque will act in the horizontal plane and can turn around the suspended container 96 about the z-axis, thereby reducing the time it takes to handle the container 96.

Referring now to FIG. 8A, there is shown a side elevation view of an automobile 8 with the torque amplifying device 3 applied to the body of the automobile 8 along a horizontal center line parallel to the x-axis. The rotary motor 4 is connected to the torque amplifying device 3. The orientation of the center line (along the x-axis) of the torque amplifying device 3 is perpendicular to the front-to-back center line (y-axis) of the car 8. The car 8 has front wheel drive and is shown accelerating. The effect of the torque amplifying device 3 can be controlled to apply a force on the front tires 11, so the traction is improved.

In FIG. 8B, a side elevation view of an automobile 8 shows the torque amplifying device 3 applied to the body of the automobile 8. The orientation of the center line of the torque amplifying device 3 is parallel to the x-axis and perpendicular to the front-to-back center line (y-axis) of the car 8 and can apply rotating force about the x-axis. When the car 8 is braking, a torque can be applied CW and can be controlled, such as with a controller 23 described above, to apply a force to the rear wheels.

FIG. 9A shows a side elevation view of an automobile 8 with the torque amplifying device 3 applied to the body of the automobile 8 around the x-axis. The orientation of the center line of the torque amplifying device 3 is parallel to the x-axis and perpendicular to the front-to-back center line of the car 8. As the car 8 runs on level ground, the torque amplifying device 3 can be controlled to be inactive.

FIG. 9B again shows a side view of automobile 8 with the torque amplifying device 3 applied to the body of the automobile 8, but with the device 3 providing a torque around the x-axis tending to lift the front of the automobile. The orientation of the center line of the torque amplifying device 3 is again along the x-axis and perpendicular to the y-axis or front-to-back center line of the car 8. When the sensors note that the front wheels are not fully supported by the surface, the controller can send a control signal to the torque amplifying device 3 to apply a torque about the x-axis sufficient to lift the front wheels 11. Thus the front wheels 11 of the automobile 8 are thereby enabled to pass the ditch.

FIG. 9C shows a side view of an automobile 8 with the torque amplifying device 3 applied to the body of the automobile 8. The orientation of the center line of the torque amplifying device 3 is perpendicular to the center line of the car 8. The torque amplifying device 3 is running and the rear wheels 12 are lifted. Thus the rear wheels 12 of the automobile 8 can pass the ditch.

FIG. 10 show the body of a vehicle 8 that has overturned. It has the left side wheel 14 in the ditch and the right side wheel 13 on the roadway. The orientation of the center line of the torque amplifying device 3 is in line with the center line of the vehicle 8. The torque is acting CW and tends to right the vehicle 8. The torque amplifying device 3 is double acting and can apply a CW or a CCW torque.

FIG. 11 shows a side view of the body of a crane 15. A load 17 is lifted by a cable 10, which is attached to a boom 16. The boom 16 is connected to the body of the crane 15. To the body 15 a torque amplifying device 3 is connected. The rotary motor 4 is also shown. The orientation of the center line of the torque amplifying device 3 is perpendicular to the center line of the crane 15. The torque amplifying device 3 is running and a torque is produced that is CCW and is counteracting the tilting torque by the load 17.

FIG. 12 illustrates an excavation machine 18 with the torque amplifying device 3 applied to the body of the machine 18. The rotary motor 4 is also shown. The orientation of the center line of the torque amplifying device 3 is perpendicular to the center line of the machine 18. The load 17 and the arm 16 are shown connected to the body 18. When a load 17 is lifted, a tilting torque is present. The torque amplifying device 3 is running and a torque is produced that is CCW and is counteracting the tilting torque by the load 17.

Figure 13A:
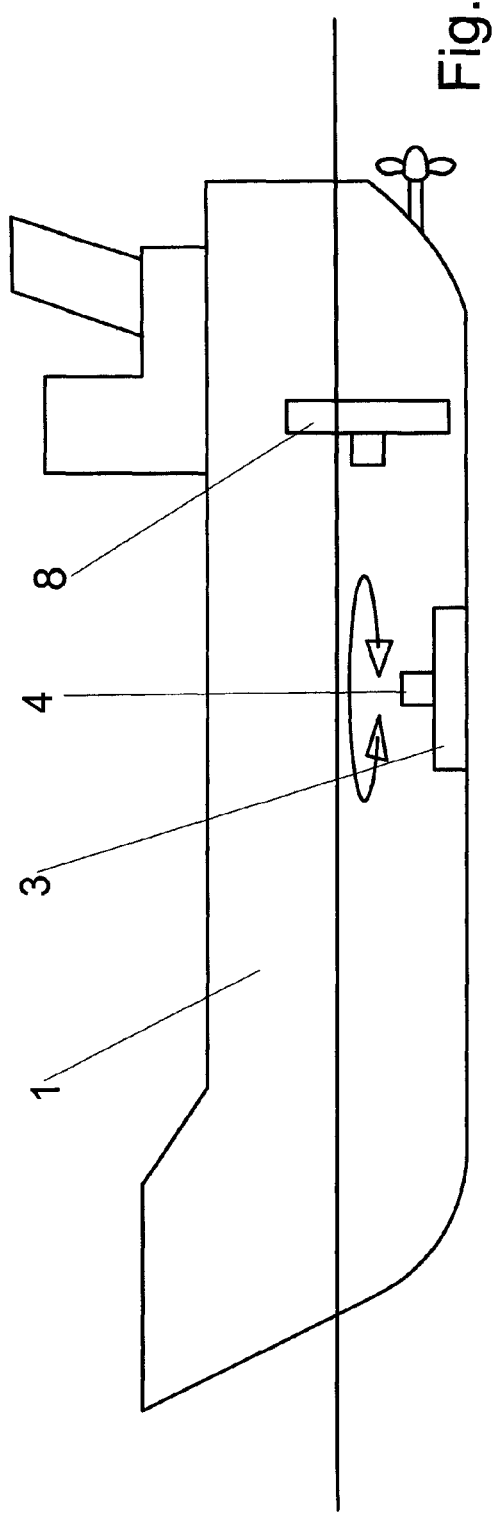
FIG. 13A is a schematic side elevation view of a ship.

FIG. 13A illustrates a side view of a ship 19, which has no rudder. A large torque amplifying device 3 with the rotary motor 4 is mounted with the center line vertical. This means that the torque from the torque amplifying device 3 acts on a horizontal plane thereby turning the ship 19. The fact that the rudder is eliminated means that it will be less drag. This speed of the ship is improved and the fuel consumption is less. The torque amplifying device 3 is double acting can apply a CW or a CCW torque.

An additional torque amplifying device 3 can be applied with the center line parallel to the center line of the ship 19. This is to reduce the roll and tilt of the ship 19.

Figure 13B:
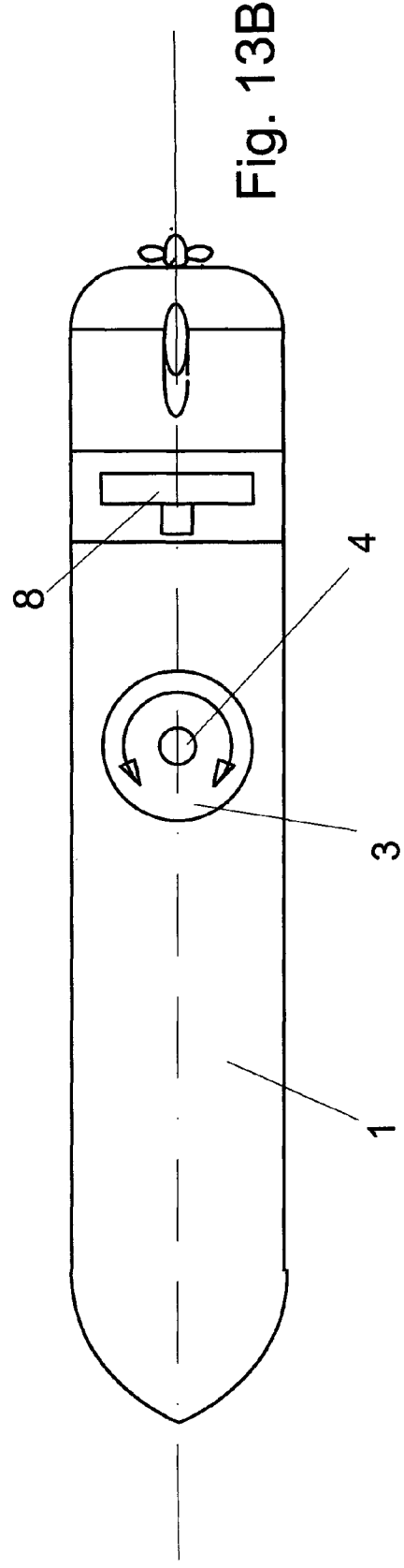
FIG. 13B is a schematic sectional top plan view of the ship, wherein the torque amplifying device is also shown. Double acting torque amplifying device is used.

FIG. 13B shows a top view of the ship 19. The torque amplifying device 3 and the rotary motor 4 is also shown.

The additional torque amplifying device 3 and rotary motor 4 is also shown.

FIG. 14A shows a side view of an airplane 20 without any control surfaces such as rudder, stabilizer and elevators.

The different parts shown are: Airplane 20, torque amplifying device with vertical drive shaft 3, motor 4, torque amplifying device 3 with horizontal drive shaft, torque amplifying device 3 with perpendicular drive shaft, main engines 22, wings 21. The torque amplifying devices 3, are double acting can apply a CW or a CCW torque.

The first torque amplifying device 3 is applied parallel with the length axis of the plane 20 and gives a torque that can roll the plane 20. The second torque amplifying device 3 is applied perpendicular to the length axis of the plane and produces a torque that changes the angle up or down of the noose. One third torque amplifying device 3 is applied so the axis is vertical and produces a horizontal torque that changes the heading of the plane. All the devices have a rotary motor 4. The torque amplifying devices make it possible to eliminate the control surfaces of a plane. The reduced drag will reduce the energy consumption and the speed will be improved. The cost of the control surfaces are eliminated, and the reduced drag will reduce the energy consumption and the speed will be improved.

FIG. 14B. The plane 20 seen from above.

The FIGS. 5-14B shows different applications of the invention.

In FIGS. 5-14B the rotary motor 4 can be replaced by a multitude of motors placed near or inside the rotor.

The centrifugal type of the torque amplifying device has been chosen for the description.

All the rotors used in the torque amplifying devices are eccentric so they generate an unbalanced centrifugal force when they spin.

With reference to the drawing, FIG. 15A illustrates one configuration of one single torque amplifying device. It shows a side view.

The centrifugal type of torque amplifying device works with eccentric rotors 28, 42 spinning so centrifugal forces are produced. The rotors 28, 42 are held by a holder 35, 40. The centrifugal forces are converted to an oscillating function of the holders 35, 40. The oscillating function of the holders 35, 40 is taken up by a unidirectional drive 32, which transfers the torque to a part of a body 36. The holders 35, 42 are mounted on the drive shaft 43.

A rotary motor 23 are connected via a coupling 26 to a drive shaft 43. The rotary motor 23 are held is place with a plate 24 which is connected to a housing 37 with two distance tubes 25 & 91. The drive shaft 43 is rotary and has a bearing 48 in the housing 37. The drive shaft 43 has two bearings 47 & 50 in the holders 35 & 40. The drive shaft 43 has a cogwheel 27 and they will rotate together. Engaged with the cogwheel 27 are two cogwheels 30 & 38. They are placed 180 degrees from each other. Through the cogwheels 30 & 38 are two rotary shafts 29 & 41. They have bearings 45, 46, 49, 51 placed in the holders 35, 42. On each shaft 29, 41 there are two eccentric rotors 28, 42. The cogwheels 30, 38 and the eccentric rotors 28, 42 are joined so the will rotate together. They are driven by the rotary motor 23 and the cogwheel 27.

The two eccentric rotors 28, 42 are mounted 180 degrees angle versus each other, so they for example will reach the position nearest the drive shaft 43 at the same time.

The holder 35 has two distance tubes 31 & 34. They are holding a plate that has an oscillating output shaft 33. It fits in a unidirectional drive 32. It is connected to a part of the part of a body 36 to which a torque shall be applied. The housing 37 is also connected to the part of a body 36.

The oscillating function of the holders 35 & 40 will be transferred to the shaft 33 of the unidirectional drive 32. In one direction it is free running and in the opposite direction can not move versus the body. The torque is transferred to the part of a body 36 when the unidirectional drive will not move. The result is that the torque acts on the part of a body 36 as a series of pulses and gaps, in one direction only.

The whole assembly shown in FIG. 15A is marked 44.

See FIG. 15B, which shows a detail of assembly 44 in a front view cross section.

As the drive shaft 43 rotates the cogwheel 27 will rotate and drives the two cogwheels 30 & 38. The shafts 29 & 41 will follow and rotates the eccentric rotors 28 & 42.

The eccentric rotors 28, 42 are assumed spinning, but the FIG. 15B shows a snapshot in time with the upper eccentric rotor 28 shown in the 6 o'clock position, and the lower eccentric rotor 42 in the 12 o'clock position. Right now the centrifugal force acts down of the upper eccentric rotor 28, and upward of the lower eccentric rotor 42. No torque is exerted on the holders 35, 40.

Ninety degrees later the upper eccentric rotor 28 has moved to the 9 o'clock position and the centrifugal force points to the left, while the lower eccentric rotor 42 has moved to the 3 o'clock position and the centrifugal force points to the right. A maximum CCW torque is exerted on the holders 35, 40.

Ninety degrees later the upper eccentric rotor 28 has moved to the 12 o'clock position and the centrifugal force points up, while the lower eccentric rotor 42 has moved to the 6 o'clock position and the centrifugal force points down. No torque is exerted on the holders 35, 40.

Ninety degrees later the upper eccentric rotor 28 has moved to the 3 o'clock position and the centrifugal force points to the right, while the lower eccentric rotor 42 has moved to the 9 o'clock position and the centrifugal force points to the left. A maximum CW torque is exerted on the holders 35, 40.

The centrifugal forces of the eccentric rotors 28 & 42 will act in different directions. This will move the holders 35, 40 in the CW direction, and in the CCW direction it will just transfer a torque to the body. So the holders 35, 40 will move in the CW direction in steps. The function will be oscillating. The preferred direction of the shaft 43 is CCW, but CW is also possible.

See FIG. 15C, which shows a version of the unidirectional drive 32. It is shown with the shaft 33 free running in the CW direction, and is transfer a torque in the CCW direction. To do this there are rollers 73 around the perimeter of the shaft 33. The rollers 73 are placed in pockets 155 of the housing of the unidirectional drive 32. The pockets 155 have a slanted surface that the rollers 73 are running against. They have a good clearance in one end (CW), and in the opposite end (CCW) it has too little clearance, so the drive will bind. Springs 70 are acting against the rollers 73, so they will engage the shaft 33 as soon as the rotation begins to move in the CCW direction.

Figure 16:
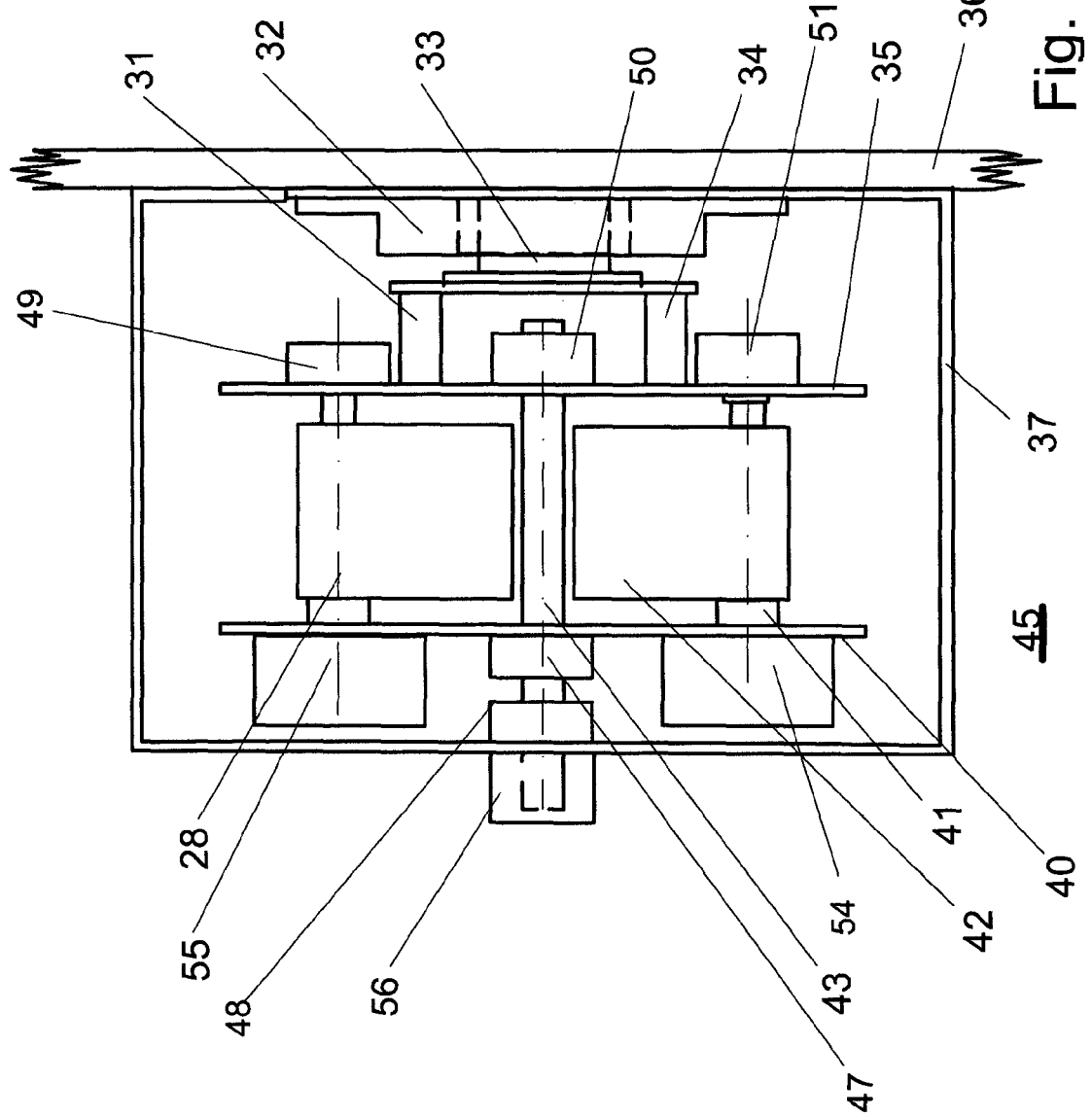
FIG. 16 is a schematic side elevation of a single torque amplifying device with motors at the rotors.

The whole assembly in FIG. 16 is marked 45.

FIG. 16 shows a side view of a torque amplifying device with the motors 54, 55 driving the rotors 28, 42. The cogwheels and the motor driving the shaft 43 are eliminated. Electrical power to the motors 54, 55 are supplied via a slip-ring coupling 56. The electrical motors are operating synchronous. In all other respect it is the same as FIGS. 15A, B.

Figure 17:
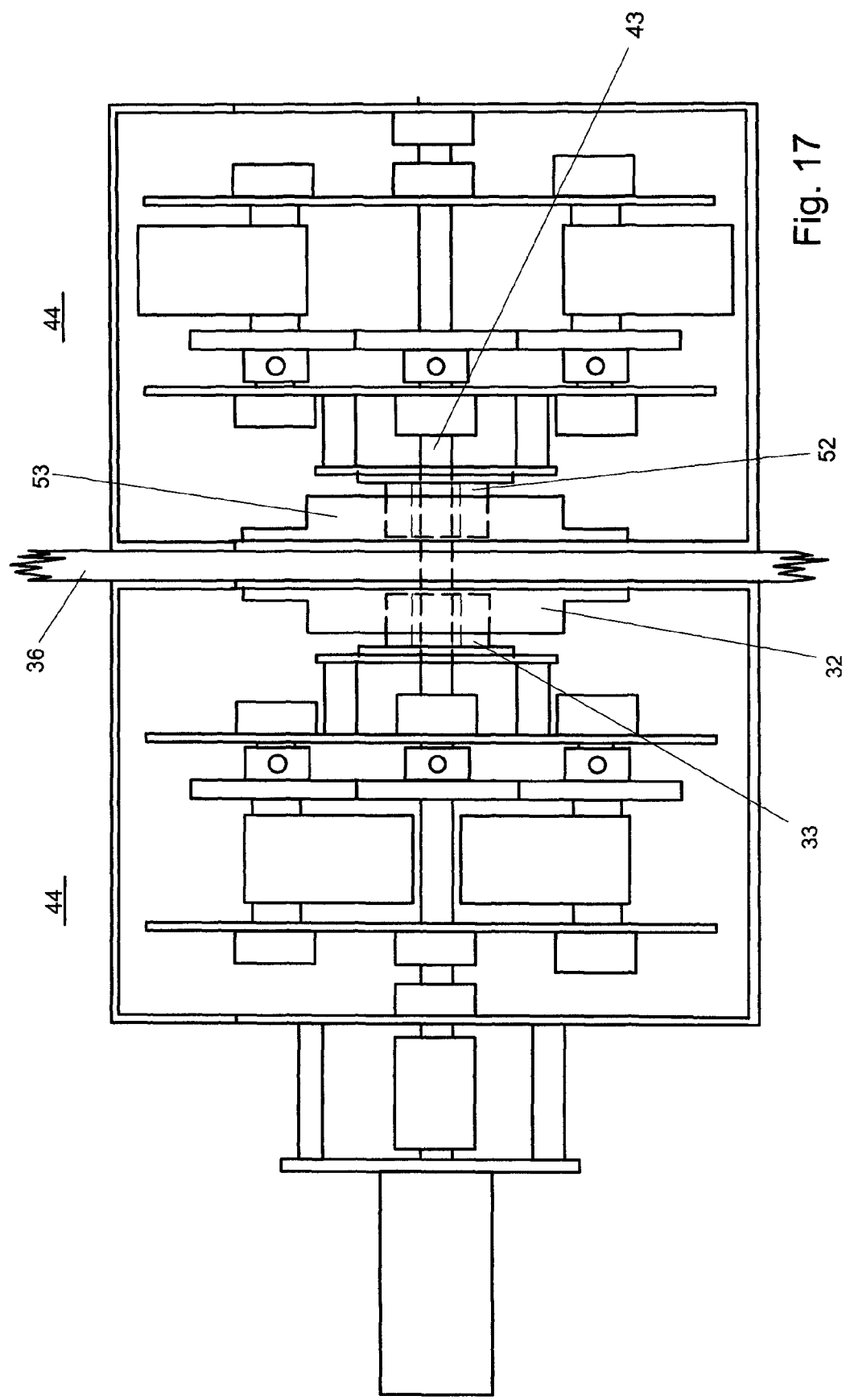
FIG. 17 is a schematic side elevation of a double torque amplifying device with motors at the rotors.

FIG. 17 shows a double torque amplifying device 45 & 45. The second device has the rotors 180 degrees off from the first. This is so that the torque pulses come in a continuous sequence.

See FIG. 17, which shows a double torque amplifying device 44 & 45. To the part of a body 36 are two torque amplifying devices 44 & 45 firmly connected. Only one motor 23 is connected and that the drive shaft 43 is extended so it goes through also the second torque amplifying device 45. An other difference is that the second pair of eccentric rotors 92 & 93 is mounted 180 degrees apart from the first eccentric rotors 28 & 42. The shafts 33 & 44 is mounted inside the unidirectional drives 32 & 94. The unidirectional drives 32 & 94 has different free running directions, but as they are mounted opposite versus each other they will give a torque in the same direction. The torque is transferred to the part of a body 36. The result is that the torque acts on the part of a body 36 as a series of pulses, in one direction only. The pulses from the first will be complimented by the pulses from the second torque amplifying device. The pulses will not overlap each other so there will be continuous pulses without any gaps.

The unidirectional drives 32 & 94 can also be mounted between the holders 35 & 40 and the housing 37.

It is also possible to use two rotary motors and two separate drive shafts, so the torque amplifying devices are independent from each other. However, the two rotary motors will be synchronized so the torque pulses do not overlap each other. The motors can be electric and of the synchronous type, or conventional motors controlled by a control system so they run with the same speed and rotary phase angle.

FIG. 18A shows the torque output from a simple torque amplifying device 44 or 45 varies with the time. The torque varies from zero up to a maximum value and then it goes back to zero. It is in essence it is a half wave of a sinusoidal curve. The torque will be at zero when the unidirectional drive is free running. The torque pulses follow each other with a delay in between.

See FIG. 18B, which shows the torque output from a double torque amplifying device 45 & 45 varies with the time. A second set of torque amplifying devices are used, phased 180 degrees off from each other, giving a more smooth transfer of the torque.

The first pulse is directly followed by the second pulse. The torque pulses follow directly each other. The torque output can be made steady by the springs in FIG. 24.

The average torque is shown in FIG. 18B.

See FIG. 19A shows a torque amplifying device 44 with the unidirectional drive offset 32 from the central drive shaft 43 to facilitate easy service or replacement of the unidirectional drive 32. A cogwheel 60 is connected to the holder 35 via pins 31, 34. It drives the cogwheels 59, 62. They have a shaft 57, 64 running inside a bushing 58, 65. To the cogwheels 59, 62 are two shafts 33, 63 connected. They are going inside the unidirectional drives 32, 61. A large number of cogwheels and unidirectional drives can be placed around the cogwheel 60.

FIG. 19B shows the torque amplifying device 44 in section.

See FIG. 20A, which shows a unidirectional drive and a brake. A brake rotor 69 working in conjunction with a unidirectional drive 32. When the brake rotor 69 is activated the unidirectional drive 32 works in a normal manner and a torque will be transferred in one direction and it is free running in the opposite direction. But when the brake rotor 69 is not engaged no torque will be transferred and the shaft 33 can run in any direction.

A brake rotor 69 is attached to the outer portion of the unidirectional drive 32. A brake cylinder 68 is mounted on the part of a body 36, so it can engage the brake rotor 69.

The shaft 33 is inside the unidirectional drive 32. Between the shaft 33 and the unidirectional drive 32 is there a number of rollers 73. The rollers 73 are sitting in pockets of the unidirectional drive 32. They are loaded by springs 70.

FIG. 20B shows a side view of the unidirectional drive and a brake.

Figure 21B:
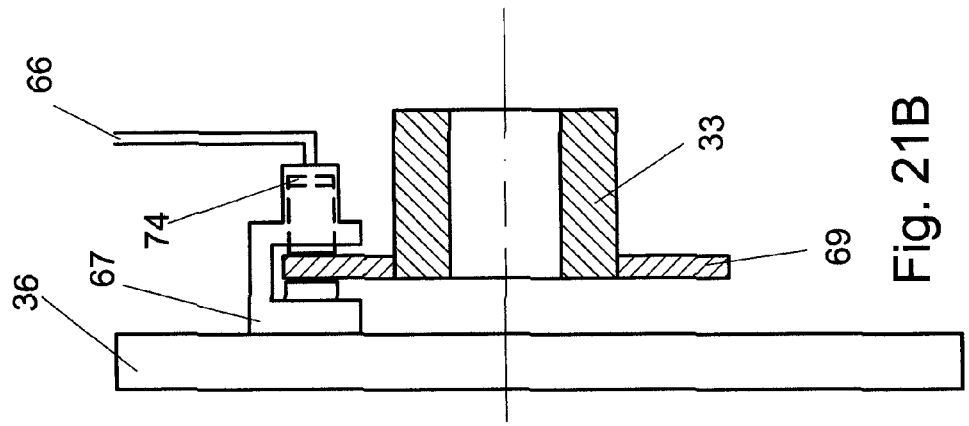
FIG. 21B is a schematic side elevation of the device of FIG. 21B.
Figure 21A:
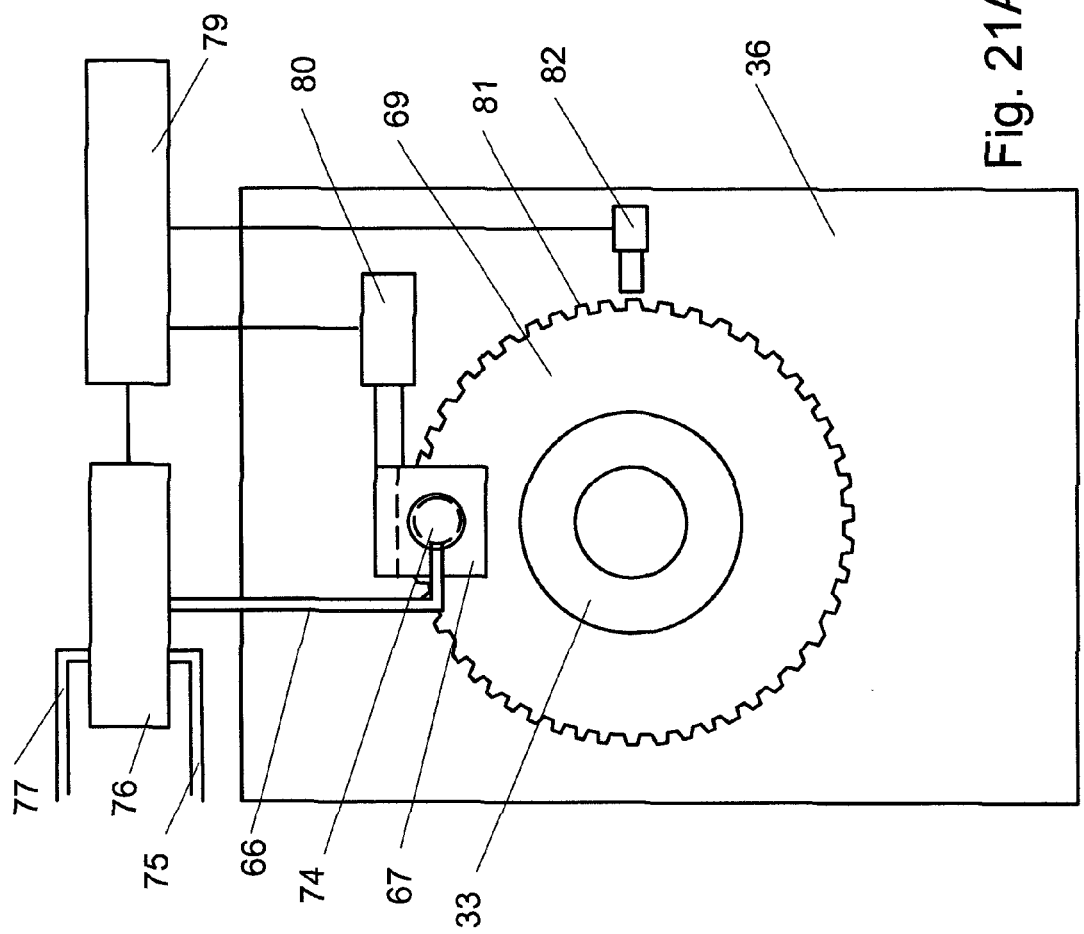
FIG. 21A is a schematic front elevation of a brake with speed and force sensors connected to a controller regulating the brake.

See FIG. 21A, which shows a brake rotor 69 and speed sensor 82 and force sensors 80 connected to a controller 79.

It shows a brake and control system that are used as a unidirectional drive. It shows the output shaft 33 with a brake rotor 69. A brake cylinder 74 will act upon the brake rotor 69 when the brake fluid 66 is pressurized. When the brake rotor 69 is engaged it can connect the output shaft 33 to the part of the body 36. The periphery of the brake rotor 69 has teeth giving pulses to a motion sensor 82 so the speed is sensed. The brake caliper 67 has a force sensor 80. The two sensors 80, 82 are connected to a controller 79 that sends signal to a hydraulic relay 76 which is connected with a brake cylinder 74 acting on the brake rotor 69.

The action of the controller 79 can be switched between CW and CCW function.

For CW torque. When the speed sensor 82 senses a movement in the CCW direction no signal is sent to the hydraulic relay 76 from the controller 79. The output shaft is free to move in the CCW direction and no torque is transferred.

When the speed has gone down to zero the speed sensor 82 triggers the controller 79. The hydraulic relay 76 sends out a high pressure, whereupon the brake cylinder 74 is activated. Now the brake rotor 69 will produce a force and a CW torque is transferred.

When the torque changes direction and the brake rotor 69 senses zero force the controller 79 is triggered off and hydraulic relay 76 goes off and the brake rotor 69 is free to move and the whole cycle is repeated.

For CCW torque: When the speed sensor 82 senses a movement in the CW direction no signal is sent to the hydraulic relay 76 from the controller 79. The output shaft 33 is free to move in the CW direction and no torque is transferred.

When the speed has gone down to zero the speed sensor 82 triggers the controller 79. The hydraulic relay 76 sends out a high pressure, whereupon the brake cylinder 74 is activated. Now the brake rotor 69 will produce a force and a CCW torque is transferred.

When the torque changes direction and the force sensor 80 senses zero force the controller 79 is triggered off and hydraulic relay 76 goes off and the whole cycle is repeated.

For example: A dual channel Hall effect direction detection sensor by Allegro MicroSystems Inc. can be used for the motion sensing and a strain gauge can be used for the force sensing.

FIG. 22 illustrates a single acting torque amplifier with reversible function. It is designed for reversible function with torque pulses that has interruptions. Brakes control the unidirectional drives.

One torque amplifying devices are mounted on a part of a body 36. The torque amplifying device has unidirectional drives 32, 97 that work in opposite directions. Together with the unidirectional drives 32, 97 are two brake rotors 69, 127 installed operated by calipers 102, 103. They have separate brake lines 89, 90. The holders 95, 108 are connected to the shaft 33.

When the left side brake 95 is active a CW torque is transferred to the body 36. When the right side brake 69 is active a CCW torque is transferred to the body 36.

When none or both brakes 102, 107 are activated no transmission of torque happens.

Two slip-ring connectors 83 gives power to the motors 84, 107.

The motors 84, 107 drive the eccentric rotors 85, 88, 104, 105 by the shaft 87, 106. They are held by the holders 95, 108.

FIG. 23 shows a double torque amplifying device with reversible function. The unidirectional drives are controlled by four brakes. It is connected the body 36. That can give torque pulses without any interruptions. It can drive in both directions CW and CCW.

Each torque amplifying device has one CW acting unidirectional drive 97 and one CCW acting unidirectional drive 32.

They are operated by two brakes rotors 69, 111. If brake rotor 111 is active the drive is CW and if brake rotor 69 is active the drive is CCW.

The same is repeated in the second torque amplifying device. The motors 84, 107 are 180 degrees out of phase with the motors 94, 98. It works CW or CCW torque pulses without interruptions.

The drive of the rotors is the same as in FIG. 22.

Figure 24B:
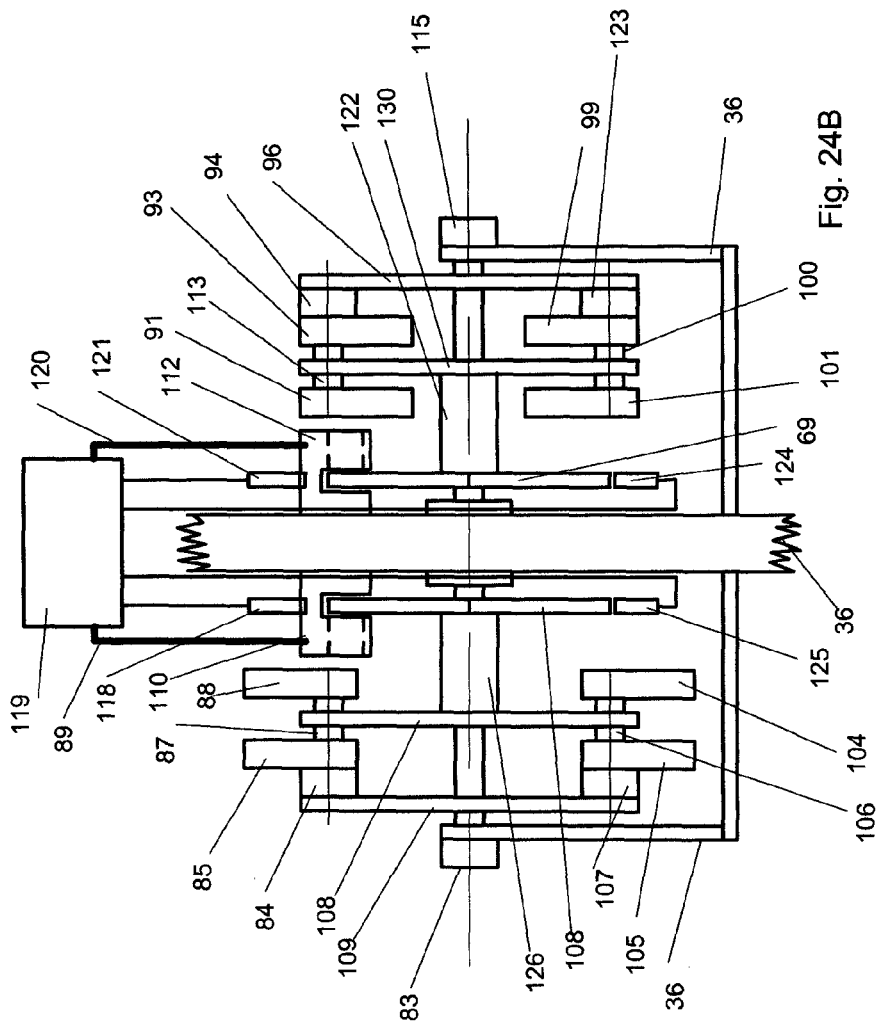
FIG. 24B is a schematic side elevation of a double acting torque amplifying with reversible function. The brakes control the unidirectional drives. There are motors driving the rotors.
Figure 24A:
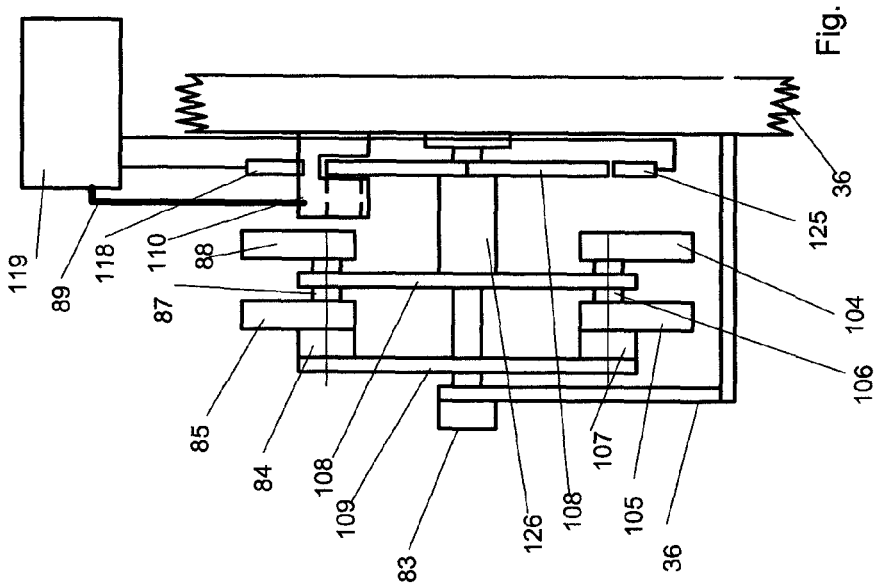
FIG. 24A is a schematic side elevation of a single acting torque amplifying with reversible function, including a brake to control the unidirectional drive.

FIG. 24A shows a single acting torque amplifying device with revesable function. It has one brake rotor 108 controlling the transfer of torque. The brake rotor 108 is controlled by a controller 119.

The torque amplifying device is the same as in FIG. 22, with the exception that the unidirectional drive is eliminated and the brake rotors are fastened to the shafts 126 which are connected to the holders 108.

FIG. 24B shows a double torque amplifying device with reversible function. Two brake rotors 108, 69 are controlling the transfer of the torque. The brake rotors 69, 108 are controlled by a controller 119.

Two torque amplifying devices are used. They are the same as in FIG. 24A.

It works CW or CCW torque pulses without interruptions.

Figure 25:
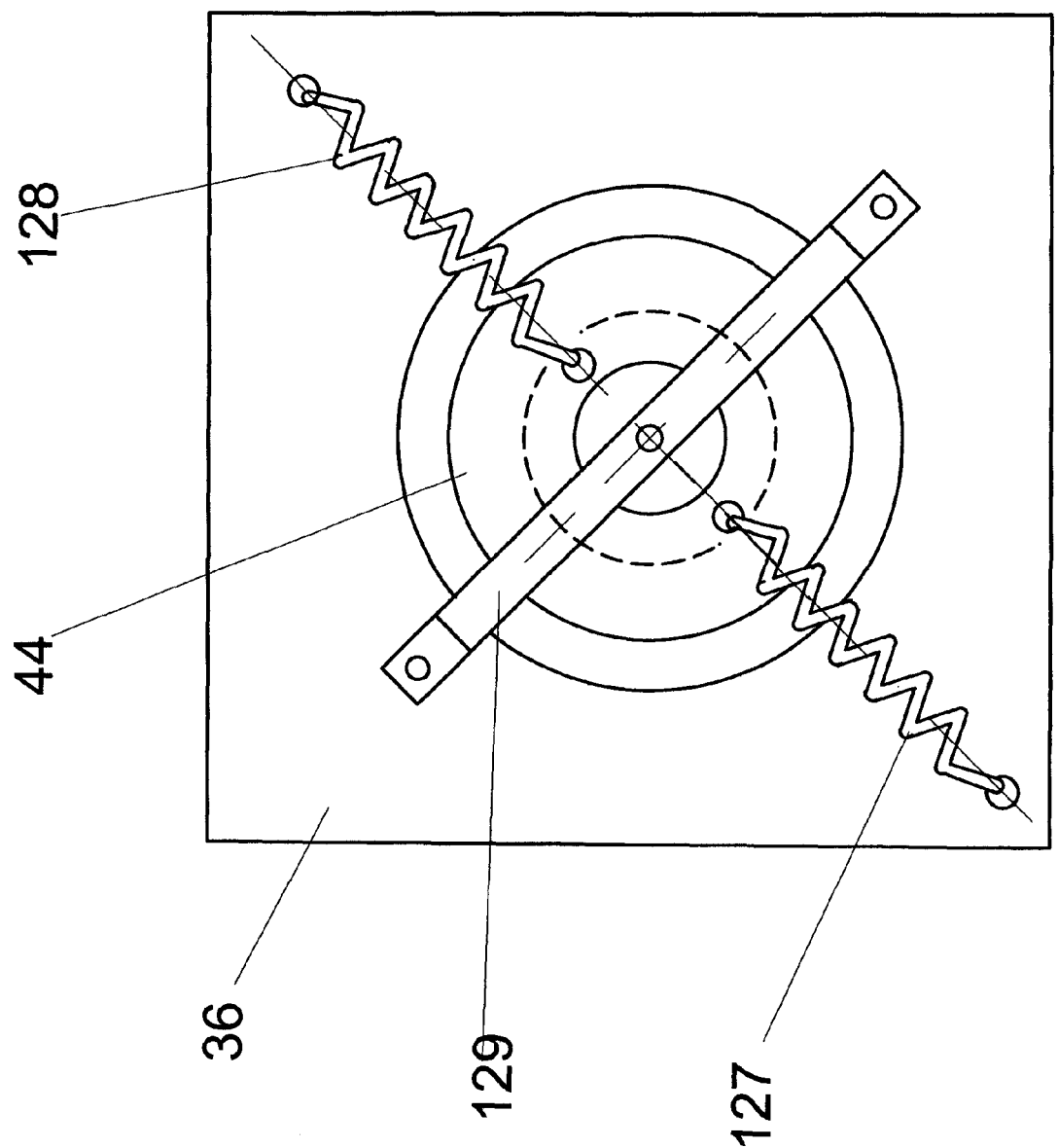
FIG. 25 is a schematic front elevation of a single or double acting torque amplifying device with springs to reduce the pulsations of the torque.

FIG. 25 shows dampening of the pulsations. It works CW or CCW.

A bracket 129 is holding a torque amplifying device 44 so it can swing CW and CCW. It is held in a neutral position by two springs 127, 128. They are fastened in the torque amplifying device 44 and the part of a body 36.

FIG. 26 shows a version of the torque amplifying device with eccentric rotors that have an extra large radius. The problem is the drive shaft 43, it sets a limit for how large the radius can be. It is solved by using a short drive shaft 43 that stops at the first holder and the cogwheel 27. Now the radius of can be extended until near the shaft of the eccentric rotors 29. The two eccentric rotors 28, 42 can be offset from each other so they doesn't collide. The rest of the torque amplifying device is identical with the FIG. 15 A.

This extra large radius can be applied to all torque amplifying devices that has been described in this text.

Figure 15:
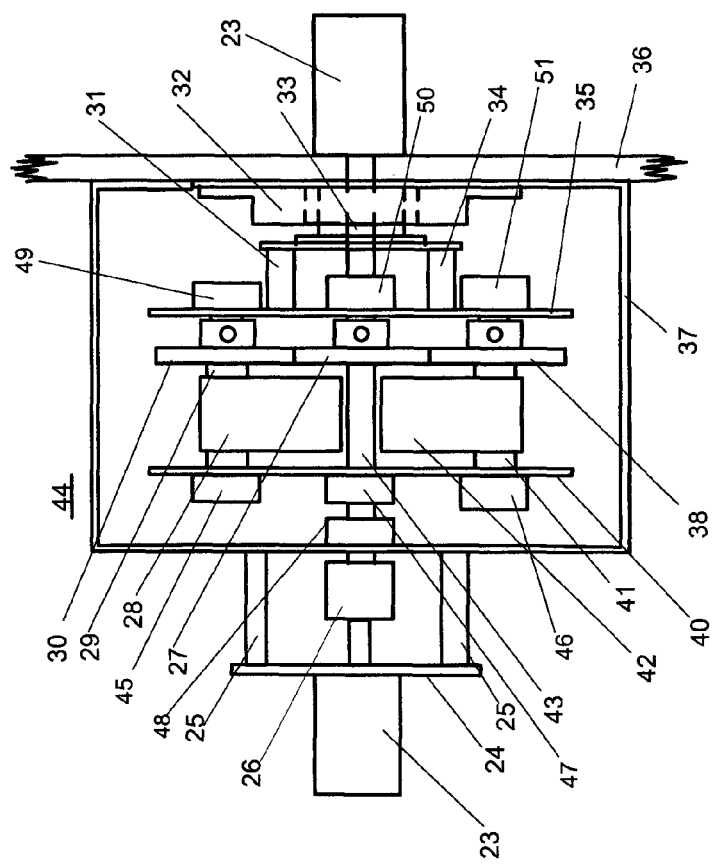
FIG. 15A is a schematic side elevation view of a single torque amplifying device.
FIG. 15B is a schematic sectional front elevation view taken along line A-A in FIG. 15A.
Figure 15:
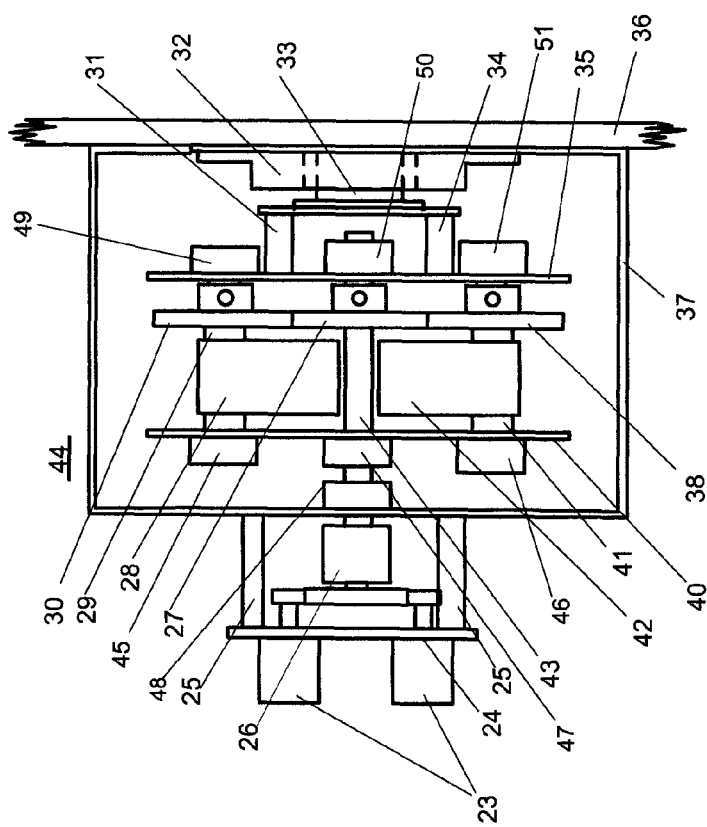

FIG. 27A illustrates an apparatus of the invention wherein rotation of the eccentric rotors 28, 42 is accomplished with one drive motor, like in FIG. 15. If the size of the cogwheels become a concern a set of intermediate cogwheels 131, 132 can be used. If needed a number of intermediate cogwheels can be used.

FIG. 27B illustrates another way of transmitting the movement from a drive motor to the eccentric rotors 28, 42 is to use conical cogwheels and shaft. On the shaft 43 is a drive conical cogwheel 137 connected. It drives two conical cogwheels 137, 139 that are supported by two bearings 142, 143 corrected to the holder 40. Two shafts 135, 139 are connected to them. Two final conical cogwheels 133, 141 drives the shaft 29, 41 and the eccentric rotors 28, 42.

FIGS. 27C and 27D illustrate in elevation from the two sides, a device according to the invention wherein the transmission comprises two timing belts 145, 147. On the shaft 43 a drive wheel 146 is mounted. It drives the two timing belts 145, 147. The shaft 29, 41 of the eccentric rotors 28, 42 has two drive wheels 144, 148. On the shafts 29, 41 are the eccentric rotors 28, 42 fastened.

FIG. 27E shows two individual motors 149, 154, which are placed near eccentric rotors 28, 42. The rotors 150, 153 of the motor are connected to the shaft 29, 41 of the eccentric rotor 28, 42. The stators (not shown) of the individual motors 149, 154 are connected to the holder 40.

The power to the two individual motors 149, 154 are supplied via a slip-ring coupling 151, that are connected via cables 152 to the two individual motors 149, 154. The individual motors 149, 154 can for example be of electric or hydraulic type.

Of course, the motors can be fastened on any suitable place on the holder 40, and transmit the rotation to the eccentric rotors 28, 42 with cogwheels.

FIG. 27F shows the same device as FIG. 27E, except that the individual motors 149, 154 are placed inside the eccentric rotors 28, 42. The rotors 150, 153 of the individual motors 149, 154 are fastened in the holder 40. This makes the motors spin together with the eccentric rotors 28, 42.

As an option, the eccentric rotors can be interconnected by a cogwheel 27, 30, 38 transmission. That will be helpful when horizontal placement of the torque amplifier is used. The weights of the eccentric rotors 28, 42 will be balanced.

FIG. 27G shows a double torque amplifier 44, which is powered by motors 4, 4'. It has two drive shafts 43 that are not connected.

FIG. 27H shows a double torque amplifier 44, which is powered by motors 4, 4'. It has one drive shaft 43 that powers both halves of the torque amplifier 44.

FIG. 28A shows a single torque amplifier 45 in a side view cross section with special type of motors 168, 165, 167 and 169, that can supply a large torque to the eccentric rotors 28 and 42. The motor stators 165 and 169 are fastened to the holder 40. The motor stators 165 and 169 can be segment as shown or full stator. Two rings 167 and 168 are fastened to the eccentric rotors 28 and 42. The power supply 166 has multiple parts that will supply all the coils in the motor stators 165 and 169. The rings 167 and 168 can be made of aluminum. The motors 168, 165, 167 and 169 are of the induction type. The eccentric rotors 28 and 42 have two cogwheels attached. They are interconnected by a cogwheel 161 that is rotatingly attached to the main shaft 43. The cogwheels 160, 161 and 162 make sure the rotors 28 and 29 rotate with the same speed and the correct phase angle. FIG. 28B shows a cross section of the same as in FIG. 28A.

More than one unidirectional drive can be used. One unidirectional drive can be mounted on the right and left hand shaft, making it possible to transfer the double torque. It is also possible to use more than one unidirectional drive on each shaft.

The torque amplifier can orientate the body in pitching, rolling or yawing, so that it achieves the attitude that a control system is calling for. Different type of sensors can be connected to the control system.

Every precaution must be taken to avoid any loss of life or injury, when the invention is used. The centrifugal forces are extremely powerful. Do not work on any moving part. There is a risk to get hurt by moving parts. If a part breaks lose there is a risk from flying debris. It can fly a considerable distance. A sufficiently strong enclosure around the torque amplifying device is highly advised. Also, a malfunction or improper use of the torque amplifying device or its controllers or auxiliary system can have a very serious effect on the structure it is applied to and/or the surroundings. Malfunction of a torque amplifier used for controlling a moving body can have serious consequences, including a crash.

Figures 29A, 29B:
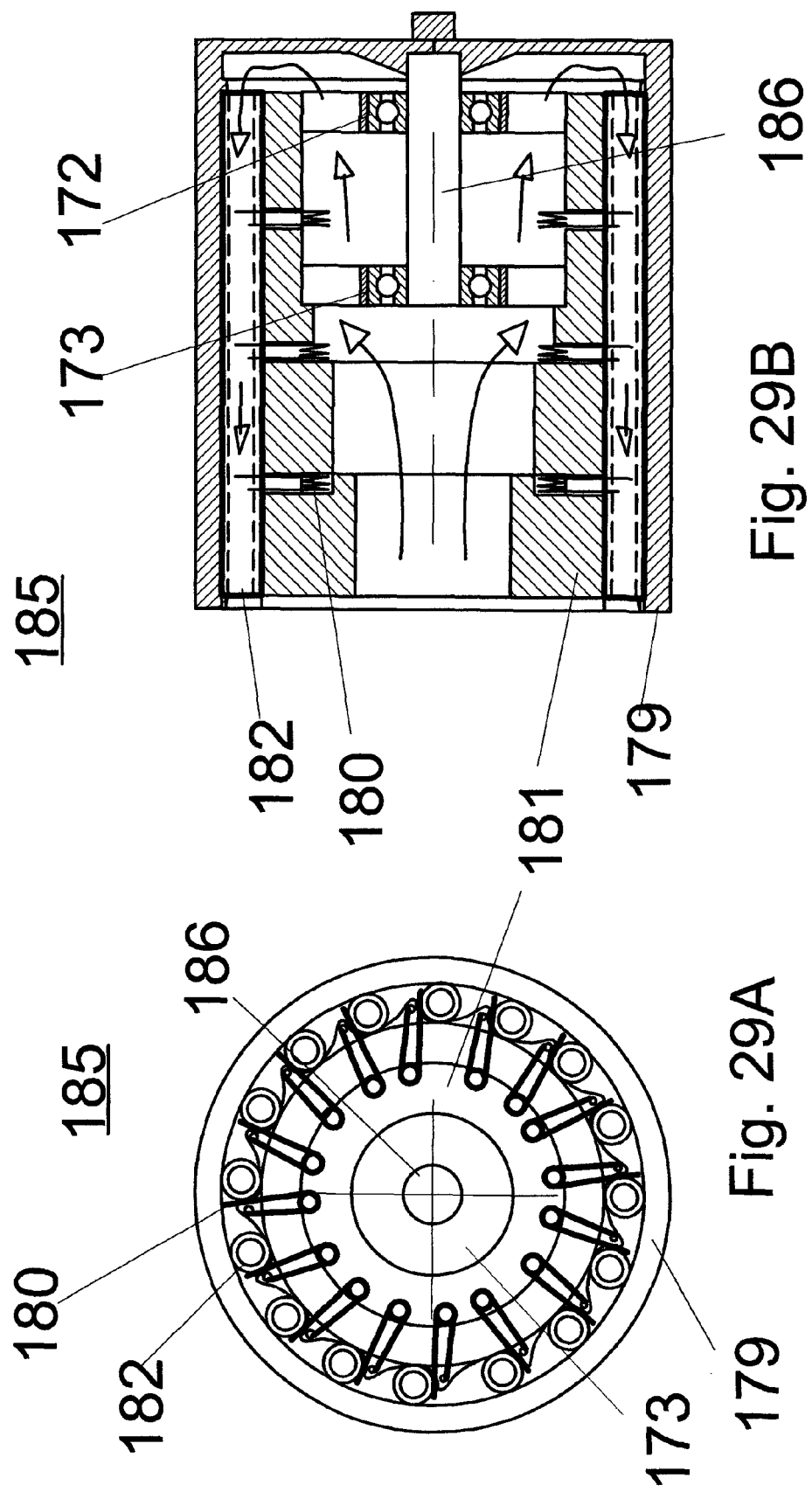
FIGS. 29A and 29B show a modified unidirectional drive.

The unidirectional drive of the invention has very demanding work to do, so a modified version is needed in some cases. I will first describe the problem and proposed solutions in general without specific reference to the drawings of FIGS. 29A & B.

Heat is developed when the unidirectional drive is running in the free direction. While a drag torque causes heat to build up, it can be dissipated on a unidirectional drive as already described by conduction to the structure or the body, and in some cases by cooling fins on the body.

In some embodiments, the rollers will be spring loaded, and a part of the spring force acts on the roller in such a way that it is pressed against the outer race, causing friction.

When a back and forth movement takes place on a unidirectional drive, it is called indexing. A limiting factor of the unidirectional drive is the rate the indexing can take place.

On a roller clutch the speed with which the rollers can move from the free running position to the blocked position depends on the strength of the springs and the weight of the rollers.

In order to get a high indexing speed, strong springs are needed; but in order to get a low drag torque, a light spring force is needed. So a compromise is needed.

To solve this dilemma following design modification of the unidirectional drive has been done.

First, the rollers need to be lighter. Titanium can be used, for example. The rollers can be tubular. This reduces the weight and permits a cooling airstream to pass the roller. Tubular titanium rollers will flex a little bit. This will bring down the noise level. Actually, the whole unidirectional drive can be made from titanium.

Also, the springs can be changed to hair pin springs. They are mounted in the inner race, giving its force more in line with the rollers, so a minimal force is given to the outer race.

Bearings have been added to take a transverse load to the centerline (vertical load). This is to keep the distance between the inner and outer races constant, so the rollers on one side are not squeezed. The bearings are mounted inside the inner race way. They sit on a shaft that is connected to a side wall of the outer race.

In order to improve the cooling a fan can be applied to the unidirectional drive, so air will pass through and around the rollers. This will improve the overrunning speed there by improving the performance of the unidirectional drive.

The frequency of the indexing can be improved by the lighter rollers and the hair pin springs because the lighter rollers are easier to accelerate back from the overrunning position to the active position.

Most of the shown torque amplifiers have been drawn so they are easy to understand. A torque amplifier that is more like the preferred embodiment is shown as the last drawing.

The modified unidirectional drive is used and has been moved in to the center of the hub of the modified torque amplifier. This makes the device much more compact and the performance is improved. A cooling fan has been added.

Every effort has been made to keep to weight down. The use of titanium and carbon fiber composites can be employed for many parts, with a notable exception of the eccentric weight which is preferably made of tungsten.

FIGS. 29 A & B show the modified unidirectional drive 185 of roller type. It has an inner race 181, which has cams for the rollers 182. The inner race 181 is hollow to reduce its weight and permit air to pass. The rollers 182 are tubular and are spring loaded by hair pin springs 180. Inside the inner race 181 has two bearings 172 & 173 been mounted on a shaft 186. The bearings 172 & 173 have holders with spokes that attach to the inside of the inner race 181. The shaft 186 is attached to a side wall of the outer race 179.

FIGS. 29C & D show a modified torque amplifying device which has a modified unidirectional drive of roller type. An effort to keep the weight of the device down has been made.

In FIG. 29C, eccentric weights 28, 42, 175 and 187, are mounted on a holder 170. The holder 170 has bearings for the shafts 29, 41, 183 and 184, which are mounted on a modified unidirectional drive 185 of roller type. In the center of the holder 170 are the unidirectional drive placed. The device is enclosed in a housing 37.

In FIGS. 29C & D, a cooling fan 177 is shown mounted on the unidirectional drive 185. The air first enters the inside of the inner race 181, then makes a turn and passes on the way back the inside and outside of the rollers 182. Eventually the air passes through the openings 176 in the housing 37. A motor 23 is mounted on the housing 37 so it will drive the gear train 27, 171, 30, 174, 35, 190 and 191.

The holder 170 has bearings 45, 49, 51 and 46. The bearings 172 & 173 with the shaft 185 are attached to the outer race 179 and thereby support the holder 170 and the eccentric weights, so the unidirectional drive is not affected by the weight.

Bearings 172 & 173 are mounted to take a transverse load to the centerline (vertical load). This is to keep the distance between the inner 181 and outer 179 races constant. The bearings 172 & 173 are mounted inside the inner race 181. They sit on a shaft that is connected to a side wall of the outer race 179.

To those skilled in the art to which this invention relates, many changes in construction and widely differing embodiments and applications of the invention will suggest themselves without departing from the spirit and scope of the invention. The disclosure and the description here are purely illustrative and are not intended to be in any sense limiting.

While the present invention has been disclosed and described with reference to exemplary embodiments thereof, it will be apparent, as noted above that variations and modifications may be made therein. It is also noted that the present invention is independent of the machine being controlled, and is not limited to the control of any particular type of machine. It is, thus, intended in the following claims to cover each variation and modification that falls within the true spirit and scope of the present invention.

The invention claimed is:

1. A mechanical torque amplifying apparatus, comprising:
input coupling means for connecting to a rotary power source;
oscillating motion means including means for converting a continuous rotary motion of the rotary power source to a gyroscopic or centrifugal device providing an oscillating rotary output torque that moves from clockwise to counterclockwise in regular periods as the rotary power source rotates;
output coupling means connecting the oscillating rotary output torque of the oscillating motion means to a unidirectional drive with said output torque connected to a body to change the body's heading, position or load distribution.

2. A centrifugal mechanical torque amplifying device according to claim 1, having two rotating eccentric rotors each driven by an individual motor running in the same direction and with the rotors in opposite phase.

3. A mechanical torque amplifying device according to claim 1, which includes rotating eccentric rotors each driven by an individual motor, an output shaft is oscillating and is connected to said unidirectional drive with its output torque connected to a body to change the body's heading, position or distribution.

4. A mechanical torque amplifying device according to claim 1, which includes one motor and eccentric rotors driven by mechanical means.

5. A centrifugal or gyroscopic mechanical torque amplifying device according to claim 1, wherein an output shaft is oscillating and is connected to a roller clutch which has output torque of said roller clutch connected to a body to change the body's heading, position or load distribution.

6. A mechanical torque amplifying device according to claim 1, which includes two torque amplifying devices that are 180 degrees from each other, wherein each has its own unidirectional drive.

7. A mechanical torque amplifying device according to claim 1, which includes a single motor and a single self-blocking unidirectional drive to produce half wave rectification.

8. A mechanical torque amplifying device according to claim 1, which includes a brake and controller to operate said brake.

9. A mechanical torque amplifying device according to claim 1, wherein individual motors are positioned at eccentric rotors, which are driven by said motors.

10. A mechanical torque amplifying device according to claim 1, wherein a pair of motors and the eccentric rotors are driven by mechanical means 180 degrees out of phase to produce full-wave rectification.

11. A mechanical torque amplifying device according to claim 1, wherein two torque amplifying devices are controlled by a controller to operate in conjunction, first opposed then together.

12. A mechanical torque amplifying device according to claim 1, wherein the torque is applied to a vehicle replacing or complimenting steering devices.

13. A mechanical torque amplifying device according to claim 1, wherein the torque is applied to a machine to modify weight distribution between front and rear axles.

14. A mechanical torque amplifying device according to claim 1, wherein the torque is applied to a machine to change the heading of at least a part of the machine.

15. A mechanical torque amplifying device according to any one of claims 1 to 8, wherein the torque is applied to a helicopter to produce a rolling torque, thereby compensating for a usual dissymmetry in lift of a main helicopter rotor.

16. A mechanical torque amplifying device according to any one of claims 1 to 8, wherein the torque is applied along at least one axis of an airplane to replace or supplement other control means.

17. A mechanical torque amplifying device according to claim 1, wherein the torque is applied to a body to provide means for controlling spatial orientation of the body.

18. A mechanical torque amplifying device according to claim 1, wherein the torque is applied to a land vehicle.

19. A mechanical torque amplifying device according to claim 1, wherein the torque is applied to a supply control movement to a body in water.

20. A mechanical torque amplifying device according to claim 1, wherein the torque is applied to a supply control movement to a body by applying torque about at least two of three axes of the body.

* * * * *